US006876991B1

(12) United States Patent
Owen et al.

(10) Patent No.: US 6,876,991 B1
(45) Date of Patent: Apr. 5, 2005

(54) SYSTEM, METHOD AND COMPUTER PROGRAM PRODUCT FOR A COLLABORATIVE DECISION PLATFORM

(75) Inventors: Daniel L. Owen, Lakeville, MI (US); Michael W. Kusnic, Lakeville, MI (US)

(73) Assignee: Collaborative Decision Platforms, LLC., Lakeville, MI (US)

( * ) Notice: Subject to any disclaimer, the term of this patent is extended or adjusted under 35 U.S.C. 154(b) by 490 days.

(21) Appl. No.: 09/708,154

(22) Filed: Nov. 7, 2000

Related U.S. Application Data

(60) Provisional application No. 60/163,984, filed on Nov. 8, 1999.

(51) Int. Cl.[7] .............................................. G06F 15/18
(52) U.S. Cl. ............................. 706/46; 706/45; 706/47
(58) Field of Search ..................................... 706/45–47

(56) References Cited

U.S. PATENT DOCUMENTS

| | | | | |
|---|---|---|---|---|
| 5,517,405 A | * | 5/1996 | McAndrew et al. .......... | 706/45 |
| 5,537,590 A | * | 7/1996 | Amado .......................... | 707/2 |
| 5,594,648 A | * | 1/1997 | Nakaura ....................... | 701/74 |
| 5,638,492 A | * | 6/1997 | Maeda et al. ................. | 706/45 |
| 5,677,997 A | * | 10/1997 | Talatik ......................... | 706/45 |
| 5,682,466 A | * | 10/1997 | Maeda et al. ................. | 706/46 |
| 5,701,400 A | * | 12/1997 | Amado ......................... | 706/45 |
| 5,754,738 A | * | 5/1998 | Saucedo et al. .............. | 706/11 |
| 5,787,235 A | * | 7/1998 | Smith et al. .................. | 706/47 |
| 5,809,499 A | * | 9/1998 | Wong et al. ................... | 707/6 |
| 5,873,094 A | * | 2/1999 | Talatik .................... | 707/104.1 |
| 5,953,707 A | * | 9/1999 | Huang et al. ................. | 705/10 |
| 5,970,482 A | * | 10/1999 | Pham et al. .................. | 706/16 |
| 6,012,051 A | * | 1/2000 | Sammon et al. ............. | 706/52 |
| 6,064,971 A | * | 5/2000 | Hartnett ........................ | 706/46 |
| 6,112,190 A | * | 8/2000 | Fletcher et al. ............... | 705/38 |
| 6,154,736 A | * | 11/2000 | Chickering et al. ........... | 706/59 |
| 6,272,482 B1 | * | 8/2001 | McKee et al. ................ | 706/47 |
| 6,289,513 B1 | * | 9/2001 | Bentwich ..................... | 717/106 |
| 6,341,369 B1 | * | 1/2002 | Degenaro et al. ........... | 717/117 |
| 6,477,520 B1 | * | 11/2002 | Malaviya et al. ............. | 706/47 |
| 6,490,573 B1 | * | 12/2002 | Njemanze ..................... | 706/19 |
| 6,529,889 B1 | * | 3/2003 | Bromberg et al. ............ | 706/45 |
| 6,556,977 B1 | * | 4/2003 | Lapointe et al. .............. | 706/15 |

OTHER PUBLICATIONS

Michael J. Bender & Slobodan P. Simonovic, "A System Approach for Collaborative Decision Support in Water Resources Planning" IEEE, 1996.*

Steve Glickman, "Interpreting Business Assessment Results" Jun. 8, 1998.*

Grier et al "A Decision Support Expert System for Correction of Manufacturing Process Problems"; Dec. 1990; ACM.*

* cited by examiner

*Primary Examiner*—Anthony Knight
*Assistant Examiner*—Michael B. Holmes
(74) *Attorney, Agent, or Firm*—Zilka-Kotab, PC

(57) ABSTRACT

A system, method and computer program product are afforded for providing a collaborative decision platform adapted to run on a computer. Initially, an application capable of performing decision logic is executed. Information is then retrieved from a database in accordance with the decision logic. Information is also received from a user in accordance with the decision logic utilizing a user interface. The information is then processed utilizing the decision logic. In use, the foregoing steps are carried out by a collaborative decision platform capable of retrieving and receiving the information, and processing such information for different purposes by executing different applications each capable of performing different decision logic.

22 Claims, 47 Drawing Sheets

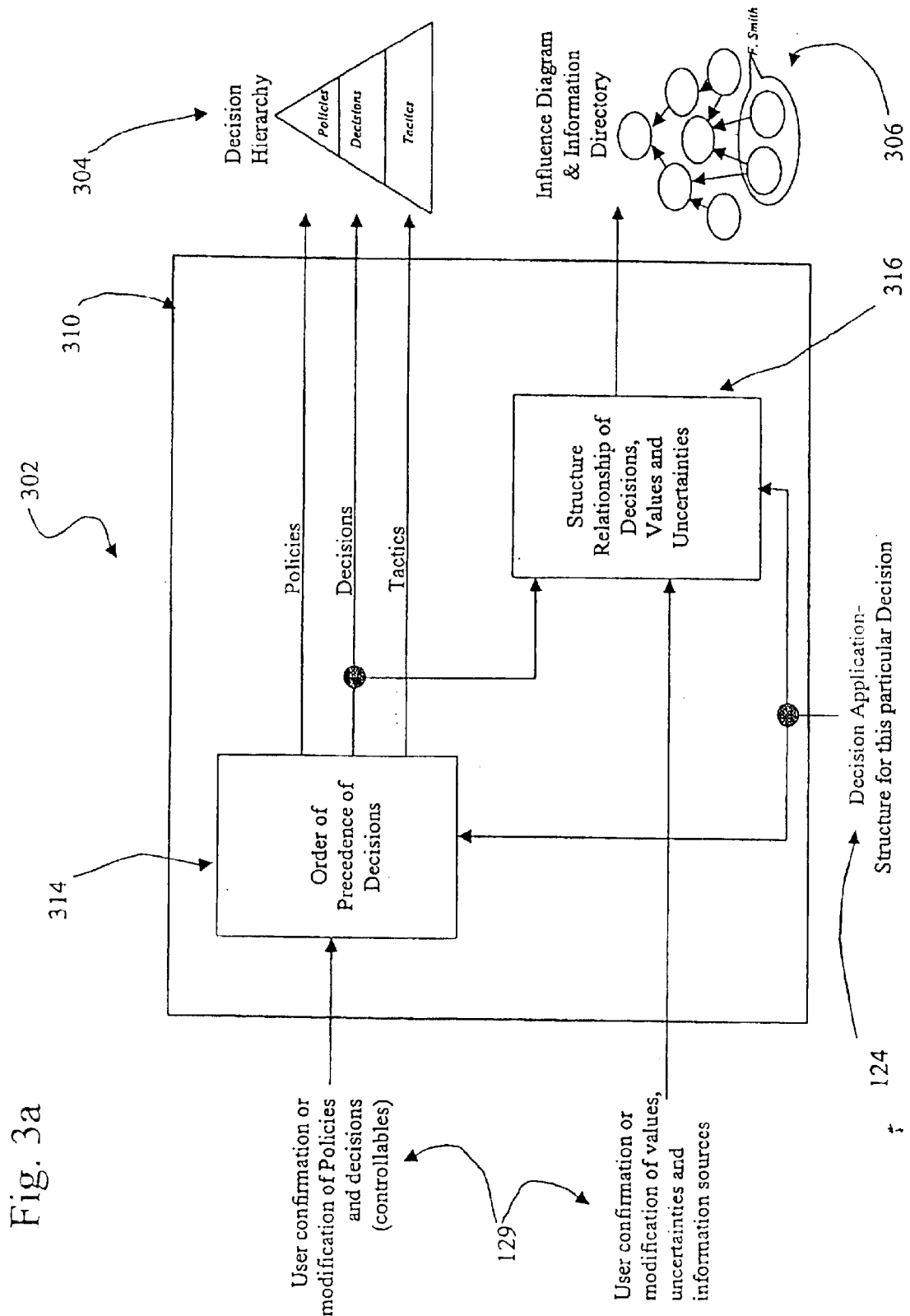

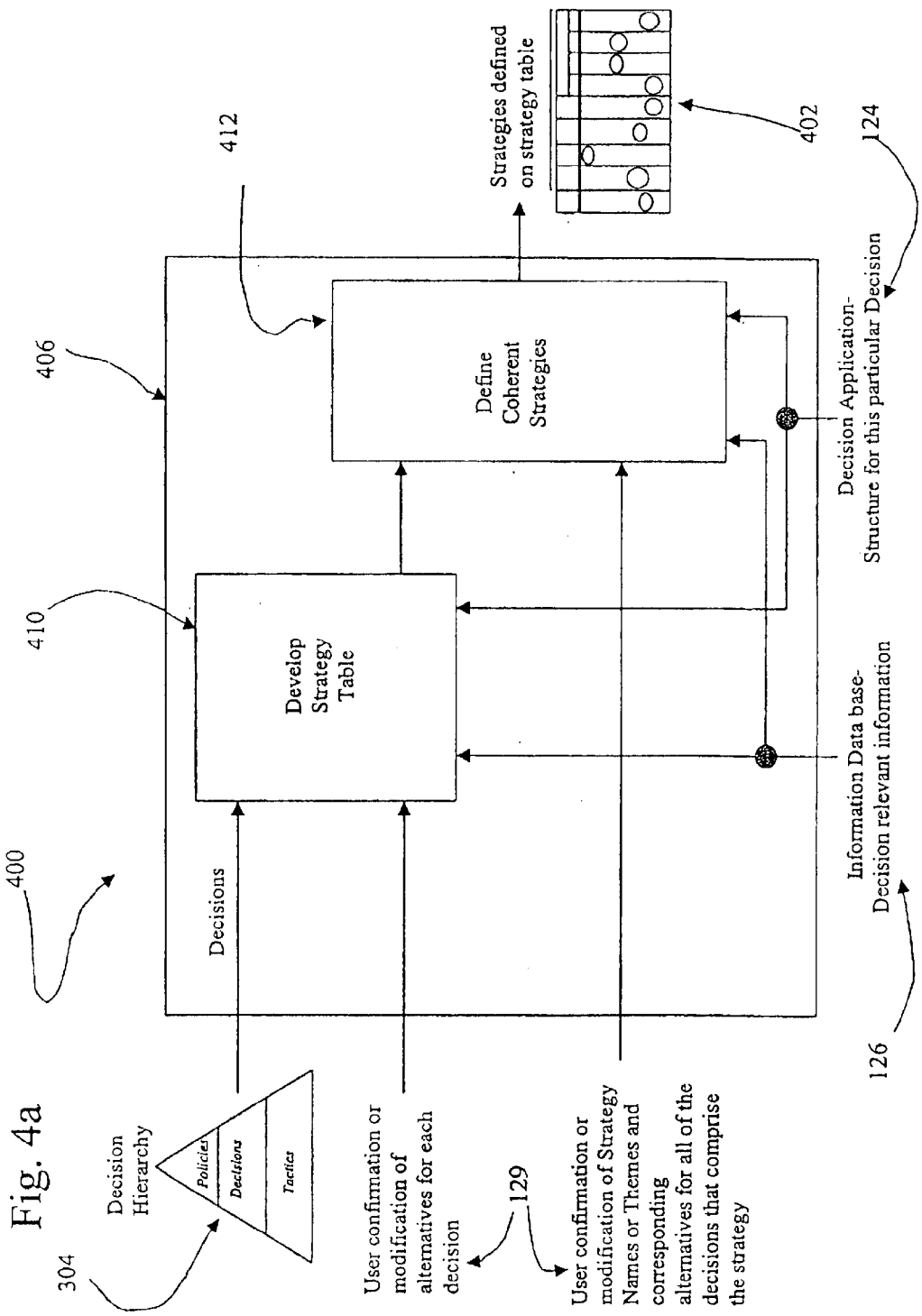

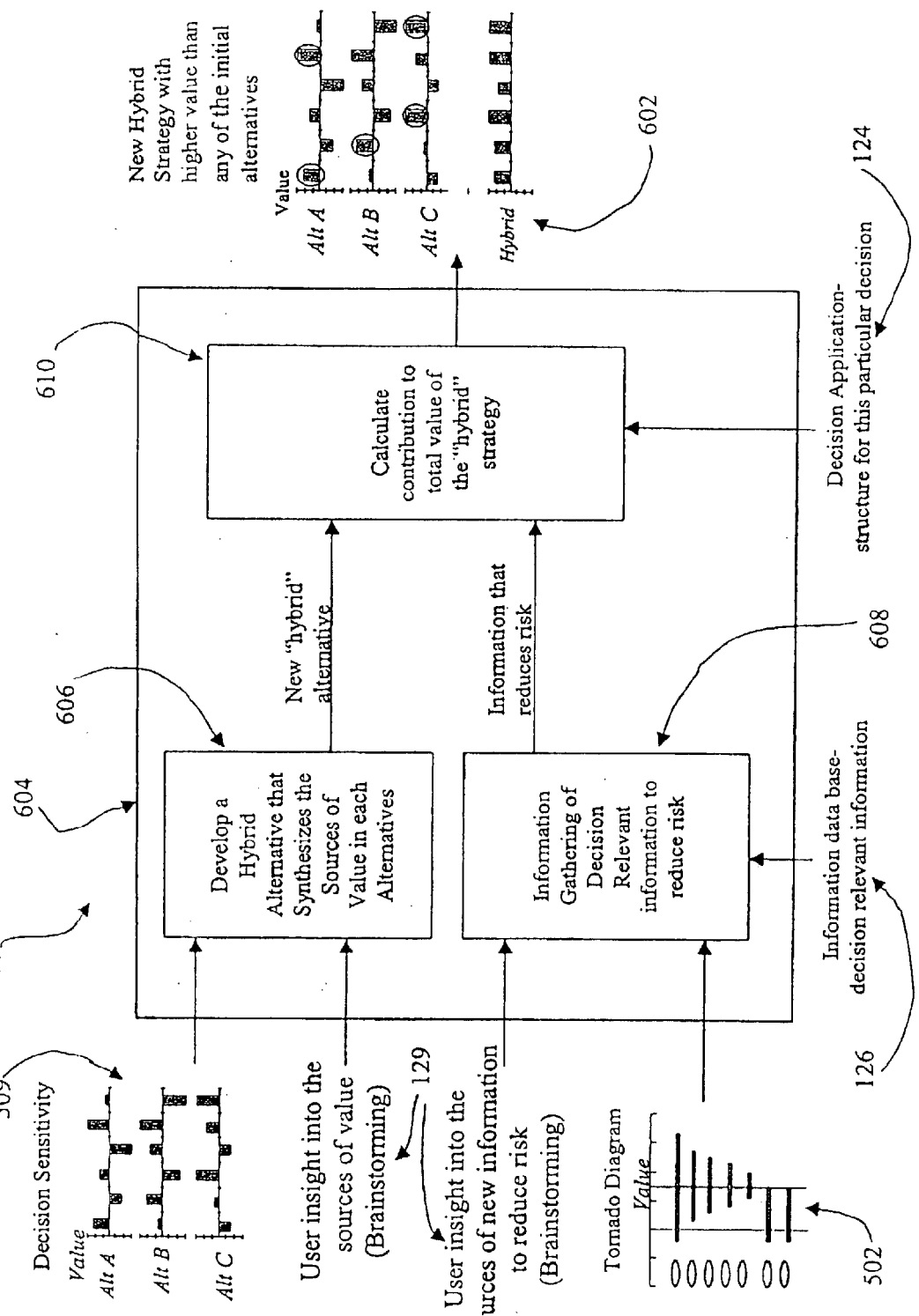

Strategy Table

| Strategy Name | Initial Participation July 1, 2000 | Participation Adjustment Jan 1, 2001 |
|---|---|---|
| No Participation | 0% | 0% |
| In and Out | 5% | 5% |
| Out and In | 7% | 7% |
|  | 10% | 10% |

| Strategy Table | | |
|---|---|---|
| Strategy Name | Initial Participation July 1, 2000 | Participation Adjustment Jan 1, 2001 |
| No Participation | 0% | 0% |
| In and Out | 5% | 5% |
| Out and In | 7% | 7% |
| | 10% | 10% |

| Strategy Table | | |
|---|---|---|
| Strategy Name | Initial Participation July 1, 2000 | Participation Adjustment Jan 1, 2001 |
| No Participation | 0% | 0% |
| In and Out | 5% | 5% |
| Out and In | 7% | 7% |
| Maximum Contribution | 10% | 10% |

Fig. 8h

| $C^3$ Attribute | Value of one percent increase in $C^3$ Attribute | |
|---|---|---|
| | Typical Automotive Manufacturer | Typical Information Technology Company |
| Revenue ($M) | 200 | 15 |
| COGS ($M) | 75 | 35 |
| SG&A ($M) | 20 | 40 |
| Inventory Turns | 12 | 15 |
| Receivable Turns | 2 | 2 |

Strategy Table

| Strategy Name | Target Customers | Enterprise | Contact Center Personalization | Contact Center Operations | Sales Force Channel | Service Channel | Sales/Service Automation | New |
|---|---|---|---|---|---|---|---|---|
| (Momentum) | Current | Current | One Size Fits All | Outsource | Outsource | (Outsource) | (None) | |
| Low Cost | Lifetime Value | New Region | (Selected Segments) | (Current) | (Tele Sales) | Tele Sales | Multiple Legacy | |
| Increased Value | (Deselect) | (Global) | All Segments | Consolidate | Indirect | Indirect | Package | |
| | Consolidate Segments | | Every Contact | Improve Efficiency | Direct | Direct | Process Based | |
| | Needs/Wants | | | New | Combined | Combined | | |
| | | | | | Portal | Portal | | |

Add Strategy

Reset Strategy

Strategy Table

| Strategy Name | Target Customers | Enterprise Reach | Contact Center Personalization | Contact Center Operations | Sales Force Channel | Service Channel | Sales/Service Automation | New |
|---|---|---|---|---|---|---|---|---|
| Momentum | Current | Current | One Size Fits All | Outsource | Outsource | Outsource | None | |
| (Low Cost) | Lifetime Value | New Region | Selected Segments | Current | Tele Sales | Tele Sales | (Multiple Legacy) | |
| Increased Value | Deselect | Global | All Segments | (Consolidate) | (Indirect) | Indirect | Package | |
| | (Consolidate Segments) | | Every Contact | Improve Efficiency | Direct | Direct | Process Based | |
| | Needs/Wants | | | New | Combined | Combined | | |
| | | | | | Portal | Portal | | |

[Add Strategy] [Reset Strategy]

Strategy Table

| Strategy Name | Target Customers | Enterprise Reach | Contact Center Personalization | Contact Center Operations | Sales Force Channel | Service Channel | Sales/Service Automation | New |
|---|---|---|---|---|---|---|---|---|
| Momentum | Current | Current | One Size Fits All | Outsource | Outsource | Outsource | None | |
| Low Cost | Lifetime Value | New Region | Selected Segments | Current | Tele Sales | Tele Sales | Multiple Legacy | |
| (Increased Value) | Deselect | (Global) | All Segments | Consolidate | Indirect | Indirect | (Package) | |
| | Consolidate Segments | | (Every Contact) | Improve Efficiency | Direct | Direct | Process Based | |
| | (Needs/Wants) | | | (New) | (Combined) | (Combined) | | |
| | | | | | Portal | Portal | | |

[Add Strategy] [Reset Strategy]

| C3 Attribute | Value of a one percent increase in the C3 attribute<br>Typical New Vehicle for Automotive manufacturer ($ Millions/year) | Value of a one percent increase in the C3 attribute<br>Typical new software product for technology company ($ Millions/year) |
|---|---|---|
| Sales Volume (units) | 100 | 40 |
| Variable Margin (%) | 170 | 15 |
| Investment Cost ($) | -20 | -3 |
| Fixed Cost ($) | -10 | -30 |

| C3 Attribute | Value of a one percent increase in the C3 attribute for a typical New Vehicle for Automotive manufacturer ($ Millions/year) | Alternative 3: Best Buy/ Cost-Driven (Percent increase in the C3 attribute) | Total value for C3 attribute increase ($ Millions/year) |
|---|---|---|---|
| Sales Volume (units) | 100 | +2 | 200 |
| Variable Margin (%) | 170 | +1 | 170 |
| Investment Cost ($) | -20 | +2 | -40 |
| Fixed Cost ($) | -10 | +2 | -20 |
| Total | | | 310 |

Strategy Table

| Strategy Name | Target Customers | Enterprise Reach | Contact Center Personalization | Contact Center Operations | Sales Force Channel | Service Channel | Sales/Service Automation | New |
|---|---|---|---|---|---|---|---|---|
| Momentum | Current | Current | One Size Fits All | Outsource | Outsource | Outsource | None | |
| Low Cost | Lifetime Value | New Region | Selected Segments | Current | Tele Sales | Tele Sales | Multiple Legacy | |
| Increased Value | Deselect | Global | All Segments | Consolidate | Indirect | Indirect | Package | |
| Hybrid | Consolidate Segments | | Every Contact | Improve Efficiency | Direct | Direct | Process Based | |
| | Needs/Wants | | | New | Combined | Combined | | |
| | | | | | Portal | Portal | | |

2900

[Add Strategy] [Reset Strategy]

Fig. 29

SYSTEM, METHOD AND COMPUTER PROGRAM PRODUCT FOR A COLLABORATIVE DECISION PLATFORM

RELATED APPLICATION(S)

The present application claims the priority of a previously filed provisional application with the title "Collaborative Decision Platform" filed Nov. 8, 1999 under Ser. No. 60/163,984, which is incorporated herein by reference in its entirety. The present application is further related to an application Ser. No. 09/708,244 filed concurrently herewith under the title "System, Method and Computer Program Product for a Customer-Centric Collaborative Protocol" by inventors Daniel L. Owen and Michael W. Kusnic, which is incorporated herein by reference in its entirety.

FIELD OF THE INVENTION

The present invention relates to decision making logic, and more particularly to a computer-based platform which supports a decision making process.

BACKGROUND OF THE INVENTION

One of the first recorded decision making processes was proposed in the $18^{th}$ century when Benjamin Franklin suggested a process by which one of two decision alternatives could be selected through listing advantages of the alternatives side by side and canceling out advantages or groups of advantages judged to be equal on both sides. Subsequently many decision processes have been proposed and are in use today. These include popular ones, such as Kepner-Tregoe where criteria for making the decision are listed and the alternatives are assessed (on a scale from 1 to 10) as to how they perform on each of the criteria. The criteria are also weighted on a similar scale and the best alternative is judged to be the highest dot product of the criteria weights and the respective assessments for the alternative against the criteria. Various modifications to this basic process in order to take into account complexities of having multiple decision makers, refining the assessment process through pair-wise comparison, etc., have resulted in many other such decision processes such as Value Management, Analytic Hierarchy Process, and others. There are also several methodologies (such as decision analyses using decision trees and probability methods) aimed at assisting a decision-maker think through the options one has in making a decision and potential outcomes of each option. However many of these decision processes are in fact not processes, but only individual tools to compare pre-defined alternatives within a pre-specified problem frame.

In order to create a process which enables multiple decision makers to make strategic decisions in organizationally and technically complex circumstances, the Dialogue Decision Process (DDP) was proposed as a sequence of four steps (framing, alternatives, analysis, connection) and is well described in literature [Barabba, V. P., Meeting of the Minds, Harvard Business Press, and other sources].

However to date, a short-coming of the process above as well as other processes, is that there has been no way to ensure that it can be applied to any decision regardless of type, complexity or number of decision makers. Furthermore, there has been no software that supports the complete sequence of these steps since each decision tends to be unique. This has resulted in each instantiation of decision processes being tailored to a particular decision. In the case of DDP, this has resulted in the process being a relatively sophisticated tool only used in certain circumstances and only when facilitated by experienced practitioners.

There is therefore a need for a computer-implemented method which may be utilized for implementing DDP in different environments in a universal manner.

DISCLOSURE OF THE INVENTION

A system, method and computer program product are afforded for providing a collaborative decision platform adapted to run on a computer. Initially, an application capable of performing decision logic is executed. Information is then retrieved from a database in accordance with the decision logic. Information is also exchanged with the users in accordance with the decision logic utilizing a user interface. The information is then processed utilizing the decision logic. In use, the foregoing steps are carried out by a collaborative decision platform capable of retrieving and receiving the information, and processing such information for different purposes by executing different applications each capable of performing different decision logic. In other words, the different applications may each provide a different decision structure. It should be noted that the various steps set forth hereinabove may be carried out using universal modules capable of interfacing with the different applications for different types of decisions via the collaborative decision platform.

In one embodiment of the present invention, the collaborative decision platform may communicate with the decision application through a standard interface protocol. Further, the information may be retrieved and received via a network. As an option, the network may be the Internet. In one example, the purpose may be real estate-related, medical-related, corporate-related, and/or financial-related.

In another embodiment of the present invention, data may be collected from the decision logic for generating visual displays of a decision hierarchy and an influence diagram. Further, the user may be prompted to approve the visual displays of the decision hierarchy and the influence diagram.

As a further option, the data may include (a) policies that form boundary conditions associated with the decision logic, (b) strategic decisions to be made, (c) values that are important to the user, (d) uncertainties that may impact the values, and a relationship between (a)–(d). Further, a strategy table may be created using the data. Optionally, the uncertainties may be assessed for analysis purposes.

In yet another embodiment, a tornado diagram and decision sensitivity output displays may be generated. The decision logic provides potential feasible hybrid themes.

In one aspect of the present invention, an operating system architecture is provided that can support decision making for all types of decisions. The architecture specifies a standard interface protocol and can accommodate any decision application (e.g. financial, medical, buying a house, selecting a corporate strategy, etc.) that has the standard interface protocol. The standard interface protocol allows individuals with expertise to develop software applications for a particular type of decision to be hosted by the collaborative decision platform. In addition, the architecture specifies a standard interface protocol for the organization of decision-relevant databases to support decision-making. The protocol allows individuals with expertise to codify their information in decision-relevant databases for application to all types decisions that are hosted by the collaborative decision platform.

A graphical user interface may be provided with a common set of displays or formats that couple with the decision-making architecture to become a platform for asynchronous, remote collaborative decision-making. The decision-making architecture enables a stable connectivity among the common displays.

BRIEF DESCRIPTION OF THE DRAWINGS

FIG. 3a illustrates various logic associated with the Framing process of the present invention;

FIG. 4a illustrates various logic associated with the Alternatives process of the present invention which is capable of handling its various input for the purpose of generating a strategy table;

FIG. 6a illustrates various logic associated with the Connection process of the present invention;

FIGS. 8a–i illustrate an example of an application of the various logic components set forth in FIGS. 3–7;

FIGS. 19 through 30 illustrate an exemplary application of the customer centric collaborative protocol.

DESCRIPTION OF THE PREFERRED EMBODIMENTS

Figure 1:
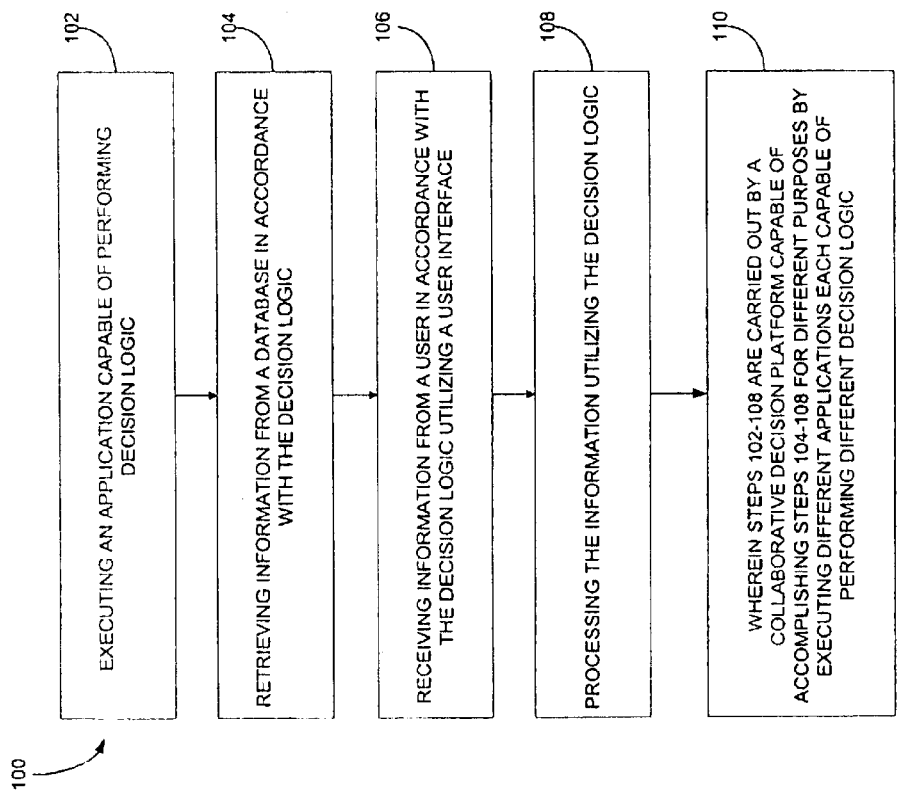
FIG. 1 illustrates a method for providing a collaborative decision platform adapted to run on a computer.

FIG. 1 illustrates a method 100 for providing a collaborative decision platform adapted to run on a computer. Initially, an application capable of performing decision logic is executed. See operation 102.

Information is then retrieved from a database in accordance with the decision logic, as indicated in operation 104. Information is then delivered to and received from a user in accordance with the decision logic utilizing a user interface. Note operation 106. The information is then processed in operation 108 utilizing the decision logic.

In use, the foregoing steps are carried out by a collaborative decision platform capable of retrieving and receiving the information, and processing such information for different purposes by executing different applications each capable of performing different decision logic. Note operation 110. It should be noted that the various steps set forth hereinabove may be carried out using universal modules capable of interfacing with different applications.

Figure 1A:
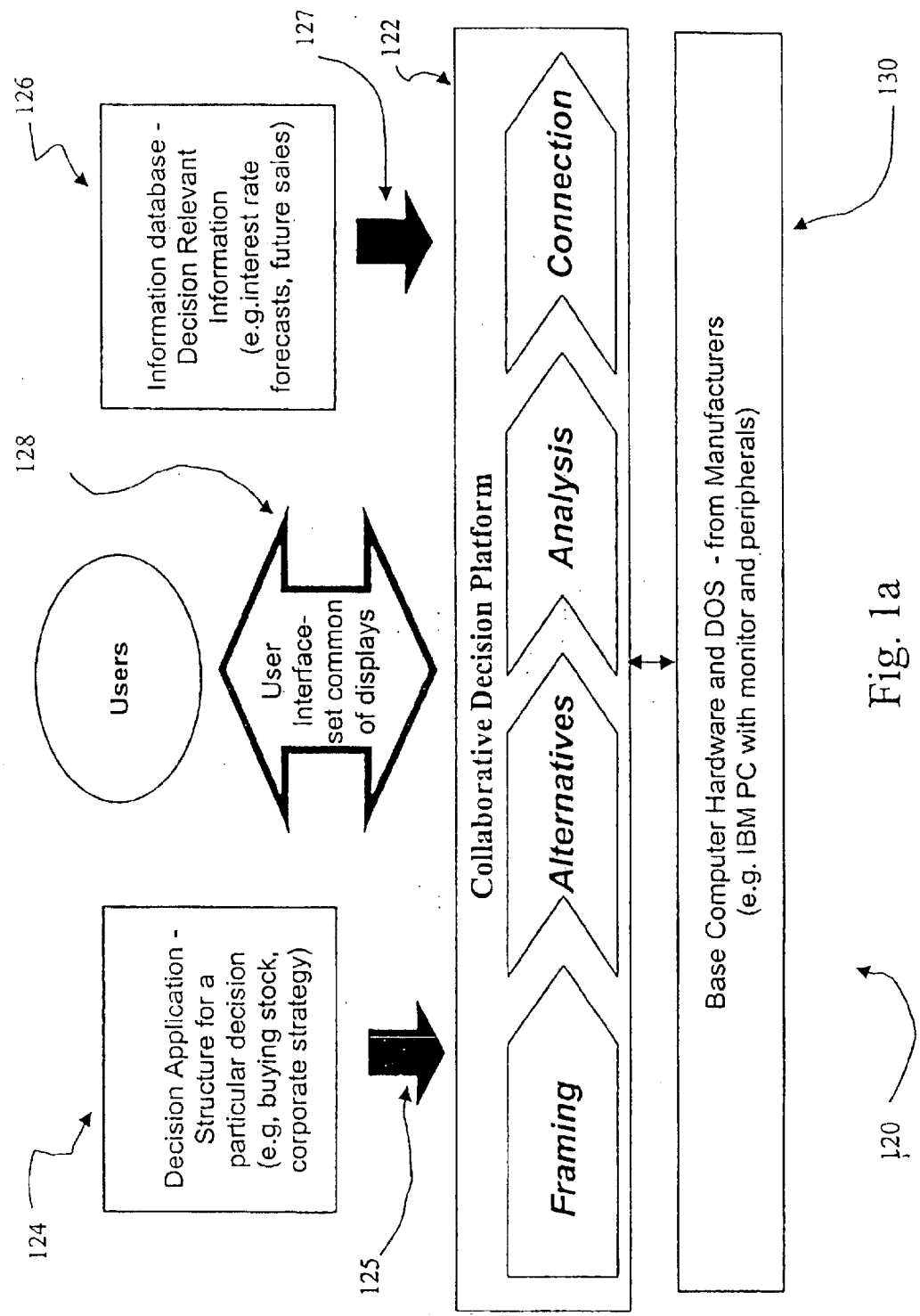
FIG. 1a illustrates a system by which the method of FIG. 1 may be carried out.

FIG. 1a illustrates a system 120 by which the foregoing method of FIG. 1 may be carried out. As shown, a collaborative decision platform 122 is provided which has an interface 125 with at least one application 124 for executing the decision logic, as set forth in operation 102 of FIG. 1. Further included is a database 126, which has an interface 127 with the collaborative decision platform 122 in accordance with operation 104 of FIG. 1. Further, a user interface 128 is provided for receiving information from and providing information to the users. The interfaces 125, 127, and 128 are defined by the collaborative decision platform 122. The users may be an important element of the system 120. Note the two-headed arrow representing the users' interface 128 with the collaborative decision platform to indicate the interaction, while the single arrowhead of the interface 125 and 127 indicates input. Note operation 106 of FIG. 1. The collaborative decision platform 122 may be run on any type of hardware architecture 130.

As set forth earlier, the various steps of FIG. 1 may be carried out using universal modules capable of interfacing with different applications. Such different applications 124 may be capable of performing decision logic relating to any type of decision-making process (e.g. financial, medical, buying a house, selecting a corporate strategy, etc.). In use, the collaborative decision platform 122 enables decision-making processes through the sequence and connectivity of a set of common displays, which describes the decision to be made. The collaborative decision platform 122 further enables asynchronous, remote decision-making processes, i.e. the ability to have different people input data into the set of common displays at different times, and from different places. Further, the database 126 may take the form of any one or a plurality of databases which may or may not be interconnected via a network such as the Internet. To this end, the present embodiment is designed to foster clear and conscientious decision-making.

Figure 1B:
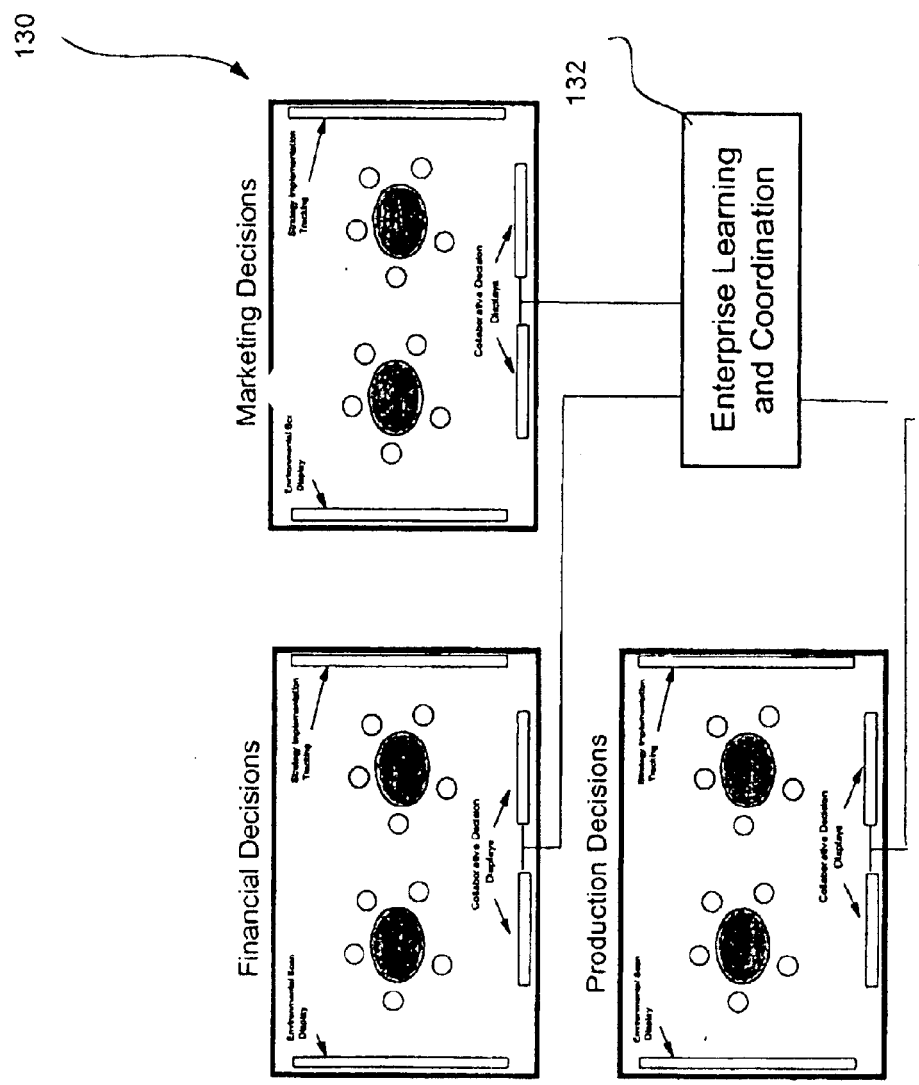
FIG. 1b illustrates a networked decision making environment in accordance with one embodiment of the present invention.

FIG. 1b illustrates a plurality of network 130 of decision environments for allowing enterprises to learn more rapidly and coordinate more effectively. Such a network of decision environments each include at least one collaborative user interface which each communicate with an enterprise learning and coordination module 132 that may include one or more collaborative decision platforms 122. Such a network 130 may allow the decision environments to be a physical arrangement optimized for human decision making or a virtual environment consisting of only the computer hardware and the collaborative decision platform 122.

Figure 2:
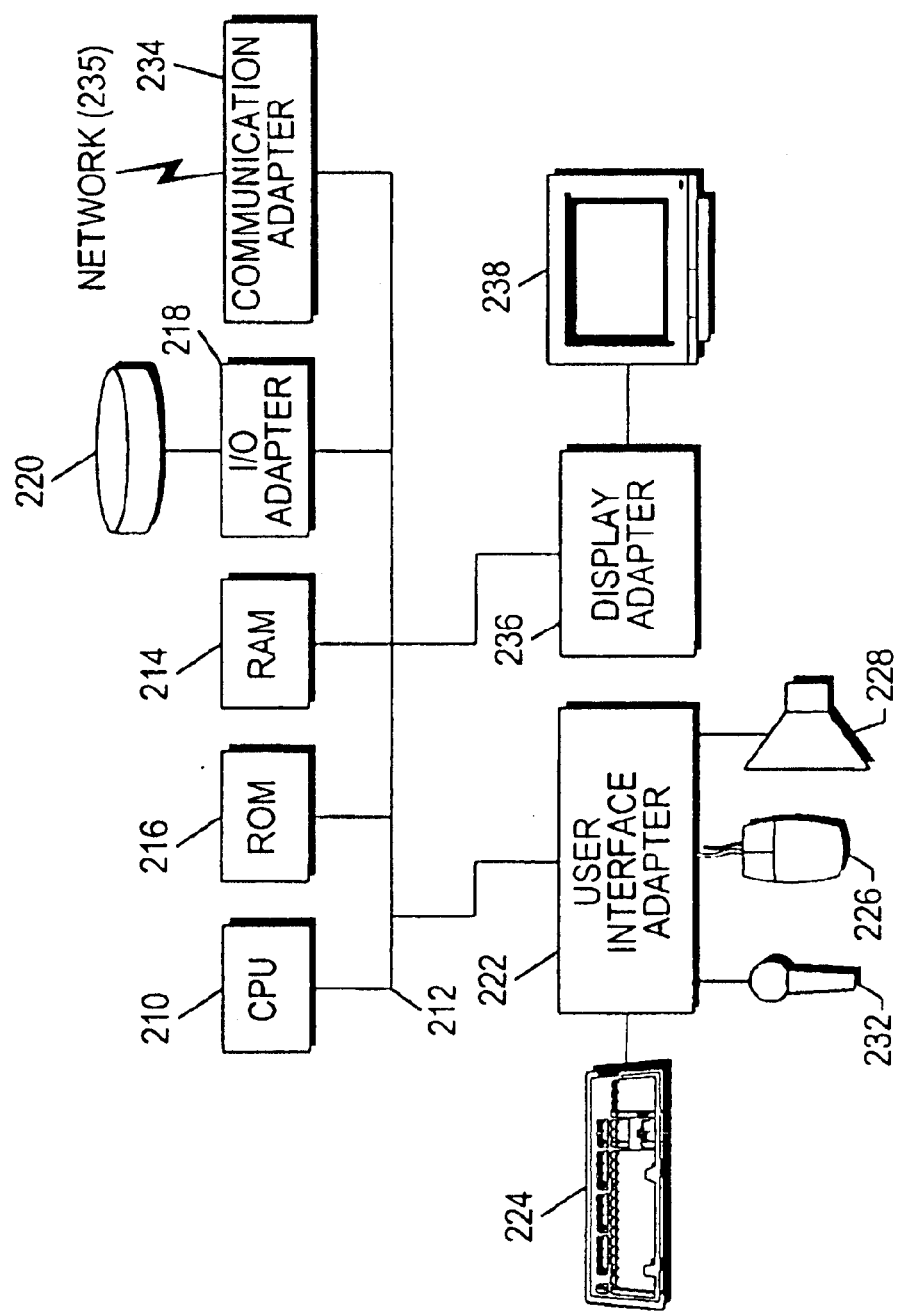
FIG. 2 shows a representative hardware environment on which the collaborative decision platform of FIG. 1a may be implemented.

FIG. 2 shows a representative hardware environment on which the collaborative decision platform 122 of FIG. 1a may be implemented. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other.

Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and soon, the programmer can also relinquish control to a greater degree than event loop programs permit the framework code takes care of almost all event handling and flow of control, and the programmer's code is called only when the framework needs it (e.g., to create or manipulate a proprietary data structure).

A programmer writing a framework pro gram not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language-2.0" (November 1995); and R. Fielding, H, Frystyk, T. Berners-Lee, J. Gettys and J. C. Mogul, "Hypertext Transfer Protocol-HTTP/I 0.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

It should be noted that, in one embodiment, the information database and the common displays may all be treated as objects by the platform. As such, the foregoing technology may be utilized in the implementation of the overall system, as embodied in FIG. 1a.

Preferred Embodiment

The platform of the present embodiment acts as a "decision engine" which drives the decision process through a sequence of logical steps to a conclusion. The users' interface during these steps is the set of common displays exhibited by the platform. The users receive and provide specific decision information to the platform by entering or modifying the structure of the decision and the decision-relevant information in the display areas where appropriate. In order to start the process, the platform hosts a decision application which provides the structure for the type of decision that the user wants to make. The application and platform communicate through a standard interface protocol. The platform guides the user through four steps (framing, alternatives, analysis and connection), but these are tailored to the decision at hand through the decision application.

Figure 3:
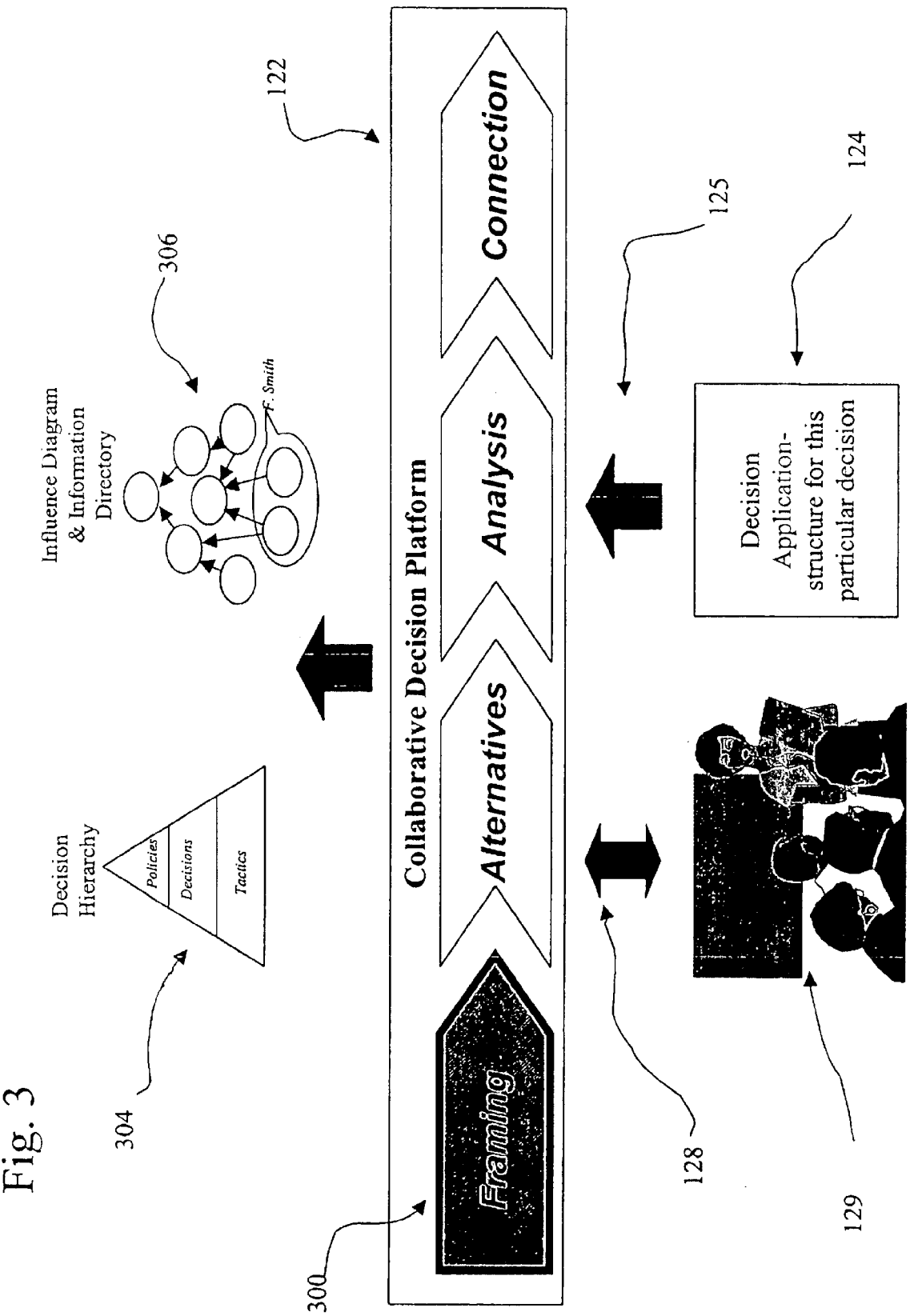
FIG. 3 illustrates an example of Framing in accordance with one embodiment of the present invention.

FIG. 3 illustrates an example of Framing 300 in accordance with one embodiment of the present invention. The purpose of Framing is to clearly communicate to the users the capabilities of the chosen decision application 124 and to allow the users to modify the problem definition to the extent that the capability for modification has been incorporated by the authors of the application. During Framing, the specific decision application provides certain key pieces of information about the decision at hand as input in a specific format or protocol 125 specified by the collaborative decision platform 122 that describe the capabilities of that application. Such input may include the policies that form boundary conditions for the decision, the strategic decisions that can be made, the values that are important to the decision makers, the uncertainties that may impact the values desired, and the relationship of the above elements.

The Framing process, using this key input from the decision application 124 in the specific format 125, generates visual displays of a decision hierarchy 304 and an influence diagram 306, to be confirmed or modified by the users. The users' information 129 is seen as an input to the framing process 300, because the users interact with the platform 122 to produce a resultant decision hierarchy 304 and the influence diagram 306 that capture their collective view of the decision problem. Note the two-headed arrow representing the users' interface 128 with the collaborative decision platform 122 to indicate the interaction, while the single arrow head of the interface 125 indicates input. In the event that the users are unable to successfully represent the decision problem as they see it with the initial decision application, they will select another application 124 and repeat the Framing process 300.

FIG. 3a illustrates various logic 310 associated with the Framing process of the present invention. As shown, a first Framing module 314 receives information from the decision application 124, such as the specific policies, decisions (controllables) and tactics that it can accommodate with a logical structure. The first framing module 314 orders the precedence of decisions to output the decision hierarchy 304. Decisions that have already been made are referred to as "policy," a set of one or more decisions of immediate interest are referred to as "strategy" or "strategic decisions" or just "decisions," and decisions that can be deferred until later are referred to as "tactics." The users confirm or modify 129 the policies, decisions and tactics. For example, the users may not want to address a particular decision at this time, in which case it would become a tactic.

Working in parallel with the first Framing module 314 is a second Framing module 316. Such second Framing module 316 receives as input pertinent uncertainties or risks (uncontrollables), information sources and values that further describe the capabilities of the decision application 124. The second Framing module 316 also receives as input the decisions identified by the first Framing module 314 and users' confirmation or modification 129 of the values, information sources and uncertainties. With such, the second Framing module 316 structures a relationship of decisions, values and uncertainties in form of the influence diagram and a corresponding directory to sources of information 306.

Figure 4:
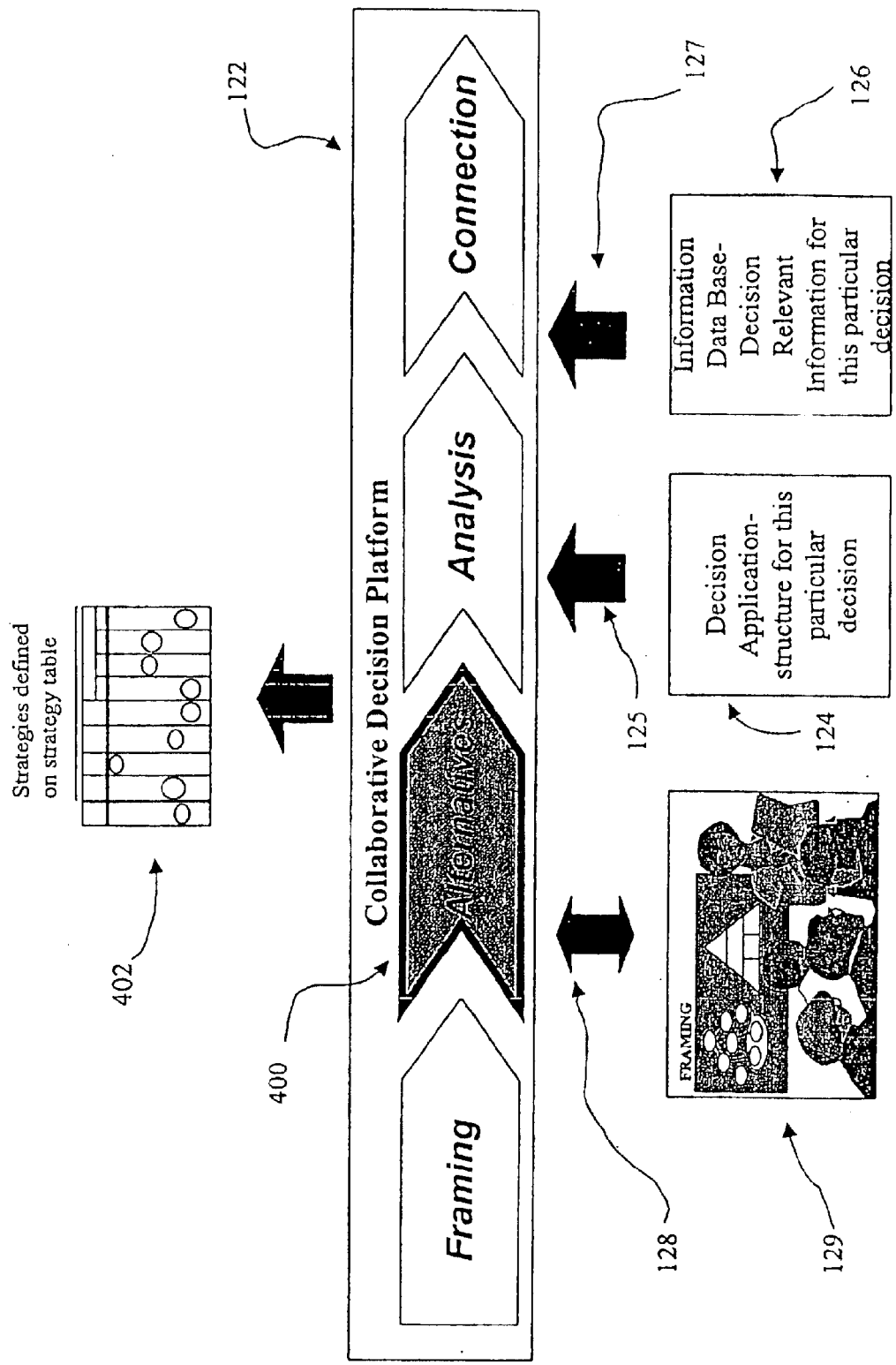
FIG. 4 illustrates an example of Alternatives in accordance with one embodiment of the present invention.

FIG. 4 illustrates an example of Alternatives 400 in accordance with one embodiment of the present invention. The purpose of the Alternatives process is to develop a set of strategic alternatives that capture the range of possibilities envisioned by the users. After Framing, the platform moves to Alternatives, and receives from the decision application 124 and the information data base 126 alternative strategies each comprised of a set of coherent choices for each of the strategic decision. The users confirm or modify 129 the alternative strategies. The platform generates the visual display of the strategies defined on a strategy table 402.

FIG. 4a illustrates various logic 406 associated with the Alternatives process of the present invention which is capable of generating several strategies defined on a strategy table 402. Included with the Alternatives logic 406 is a first Alternatives module 410 that receives the decision hierarchy 304 generated by the Framing logic 310. The first Alternatives module 410 obtains decision alternatives in each of the decision areas from the decision application 124 and from an information database 126 for the purpose of developing a strategy table. Each (strategic) decision from the decision hierarchy 304 becomes a column heading in the strategy table 402 with the alternatives for that decision arranged in a column beneath it. The first Alternatives module 410 also takes as input the users confirmation or modification 129 of the decision alternatives.

A second Alternatives module 412 combines the strategy table output of the first Alternatives module 410 with strategy descriptions from the decision application 124. The strategy descriptions include a strategy name and the selection of one alternative for each of the decisions that comprise the column headings in the strategy table 402. The second Alternatives module 412 can then display the strategies on a strategy table and incorporate the users' confirmation or modifications 129. For example, the users may want to define their own strategy, which they would do by providing the second Alternatives module 412 with a strategy name and the selection of and alternative in each column of the strategy table 402.

Figure 5:
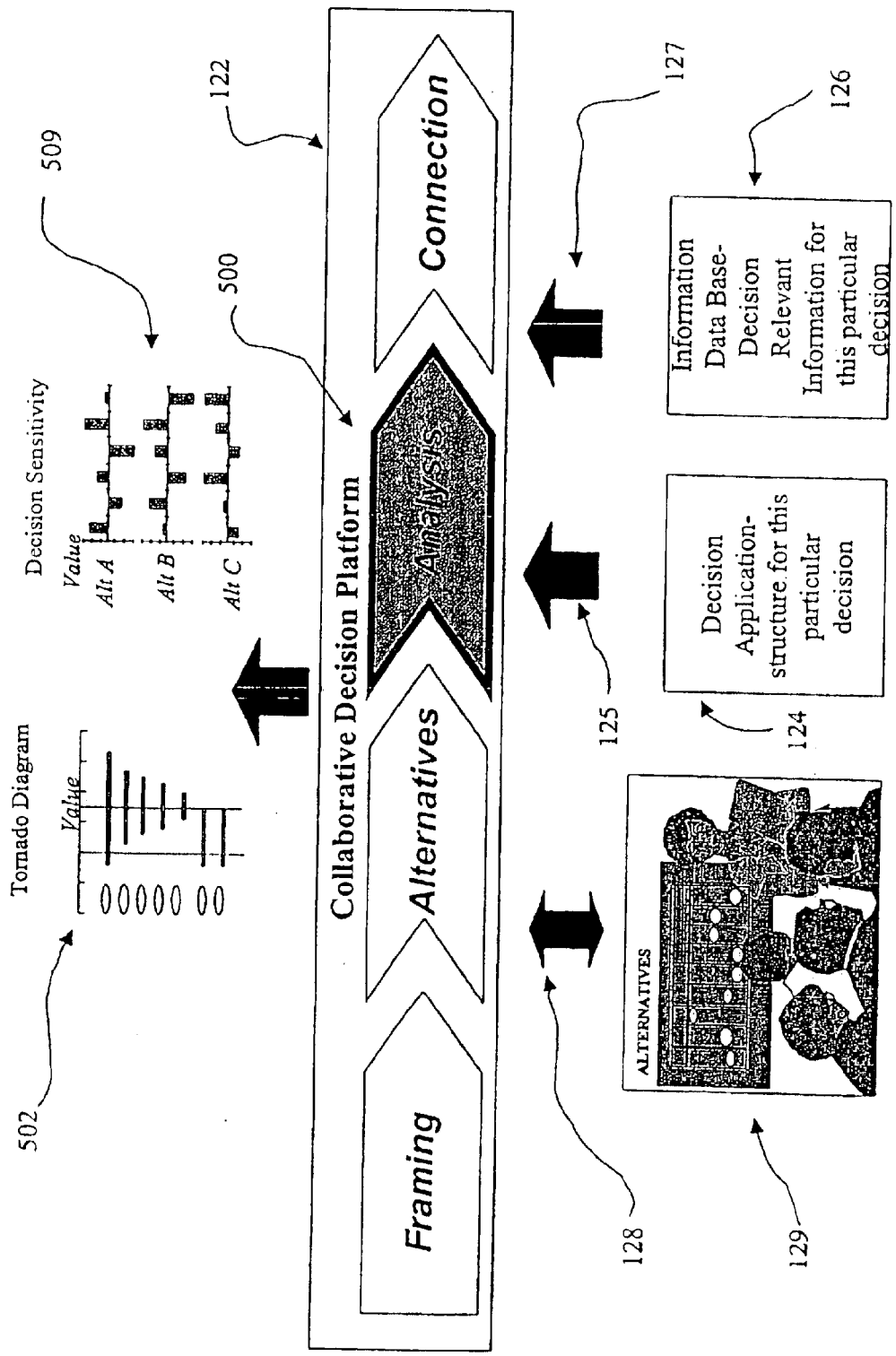
FIG. 5 illustrates an example of Analysis in accordance with one embodiment of the present invention.

FIG. 5 illustrates an example of Analysis 500 in accordance with one embodiment of the present invention. The purpose of the Analysis process is to enable the users to have a shared understanding of the significant sources of risk and value in each of the initially defined alternative strategies. During Analysis, the platform prompts the information database 126 for assessments on each of the uncertainties set forth in a format 127 specified as low estimate, nominal estimate, and high estimate. These assessments are made for uncertainties influenced by the choice of decision, as well as independent uncertainties.

Using the information generated previously and the model structure of the decision application 124, the platform makes the necessary calculations to output tornado diagrams 502 and decision sensitivity output displays for each of the alternative strategies 509. The users confirm or modify the input information 129 and structure from the decision application 124. The tornado diagrams identify the sources of significant risk in each alternative strategy and the decision sensitivity identifies the sources of significant value in each alternative strategy.

Figure 5A:
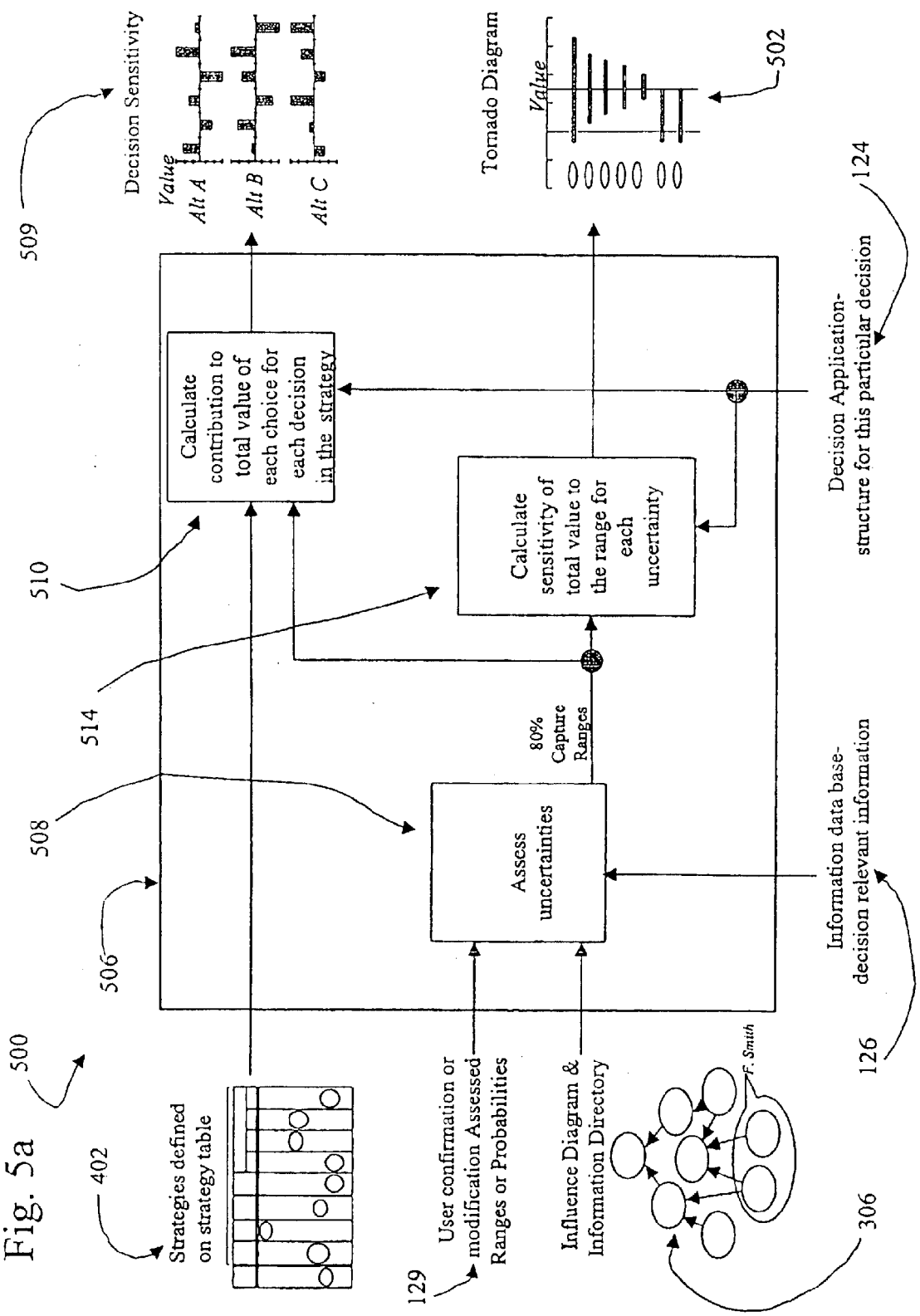
FIG. 5a illustrates various logic associated with the Analysis process of the present invention.

FIG. 5a illustrates various logic 506 associated with the Analysis process of the present invention. As shown, a first Analysis module 508 receives as input the influence diagram 306, identifying uncertainties and their relationship to the value and the decisions. The influence diagram also includes an information directory, which specifies the information database(s) 126 that will provide the decision-relevant information. This first Analysis module 508 also receives as input from the information data base(s) 126 assessed ranges or probabilities for each of the uncertainties identified by the influence diagram 306 generated using the Framing logic 310. These data ranges are confirmed or modified by the users 129.

The output of the first Analysis module 508 is further used by a second Analysis module 514. The second Analysis module 514 takes as input the structural relationship of decisions, values and uncertainties from the decision application 124. An example of such a structural relationship is a spreadsheet comprised of equations relating decisions, values and uncertainties. This output is, in turn, used to generate the tornado diagram 502 by varying each of the uncertainties over its range and recording the effect on value.

In parallel with the first and second Analysis modules is a third Analysis module 510 that takes as input the strategies defined on the strategy table 402, the output of the first Analysis module 508 and the structural relationship of decisions, values and uncertainties from the decision application 124. With such input, the third Analysis module 510 identifies a contribution to the total value of each alternative for each decision that comprises each strategy. Given this information, a decision sensitivity table 509 may be constructed.

Figure 6:
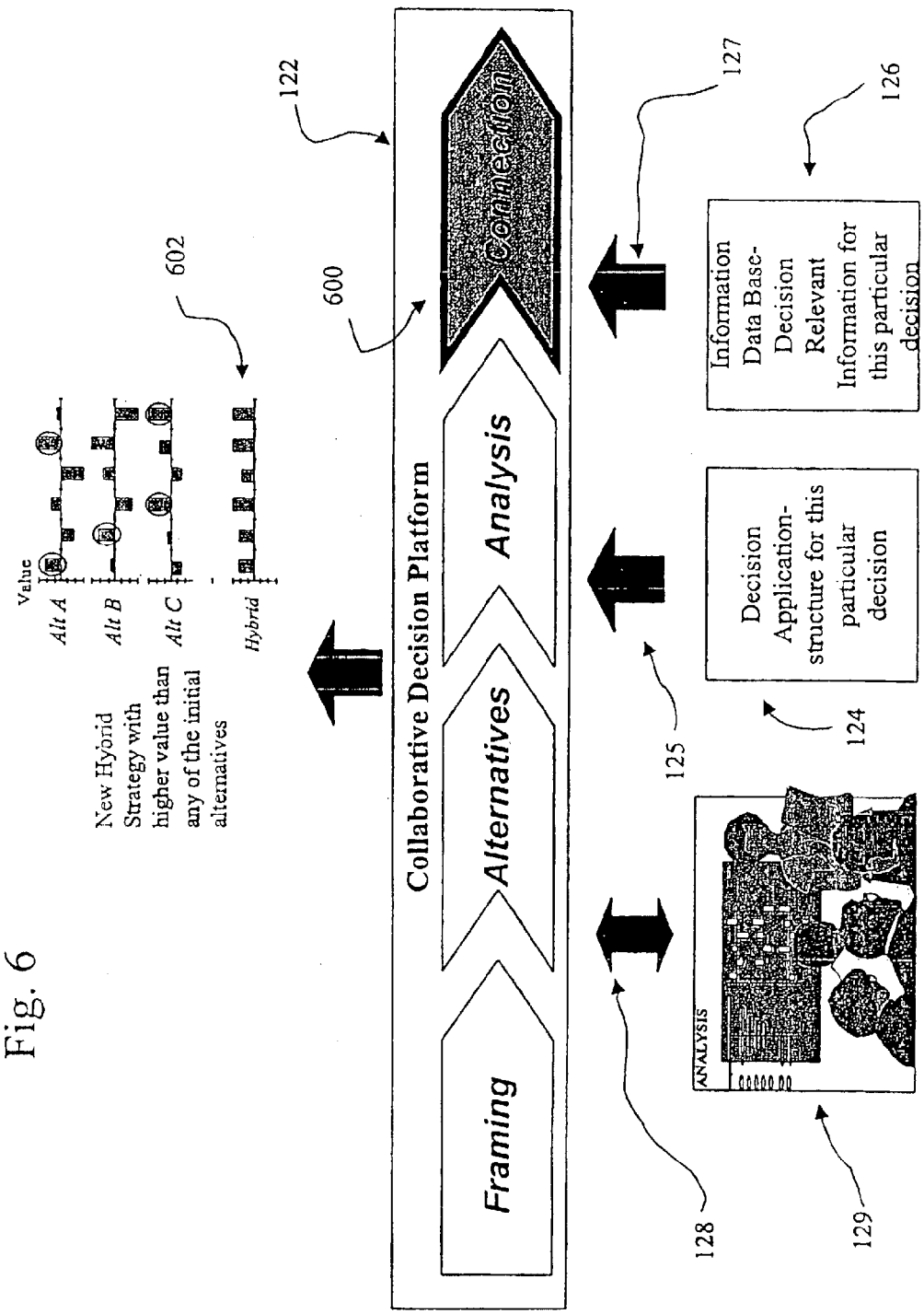
FIG. 6 illustrates an example of Connection in accordance with one embodiment of the present invention.

FIG. 6 illustrates an example of Connection 600 in accordance with one embodiment of the present invention. The purpose of Connection is for the users to develop a new, more valuable "hybrid" strategy 602 combining the most valuable decisions in each of the initially defined alternative strategies. During Connection, the users' insight into the sources of risk and value 129 interacts with new decision relevant information from the database 126 and the decision structure provided by the decision application 124 to output an evaluation of the hybrid strategy 602.

FIG. 6a illustrates various logic 604 associated with the Connection process of the present invention. As shown, the logic 604 includes a first Connection module 606 which receives as input a value contribution of each alternative for each decision that comprise each strategy, the decision sensitivity 509 generated by the Analysis logic 506. The first connection module 606 also receives as input user insight 129 regarding how to combine the sources of value into a new, more valuable hybrid strategy. A second logic module 608 of the connection logic 604 takes as input the users' insight 129 about additional information sources that could reduce the significant uncertainties or risks identified in the tornado diagram 502. This second Connection module 608 then selects that new information from an appropriate decision relevant database (perhaps one not previously used for this decision problem) 126. The description of the new hybrid alternative from the first Connection module 606 and the new risk reducing information from the second Connection module 608 are input to a third module 610. This third module 610 uses the structural relationship of decisions, values and uncertainties (e.g., spreadsheet) from the decision application 124 to output the value of the hybrid strategy 602.

Figure 7:
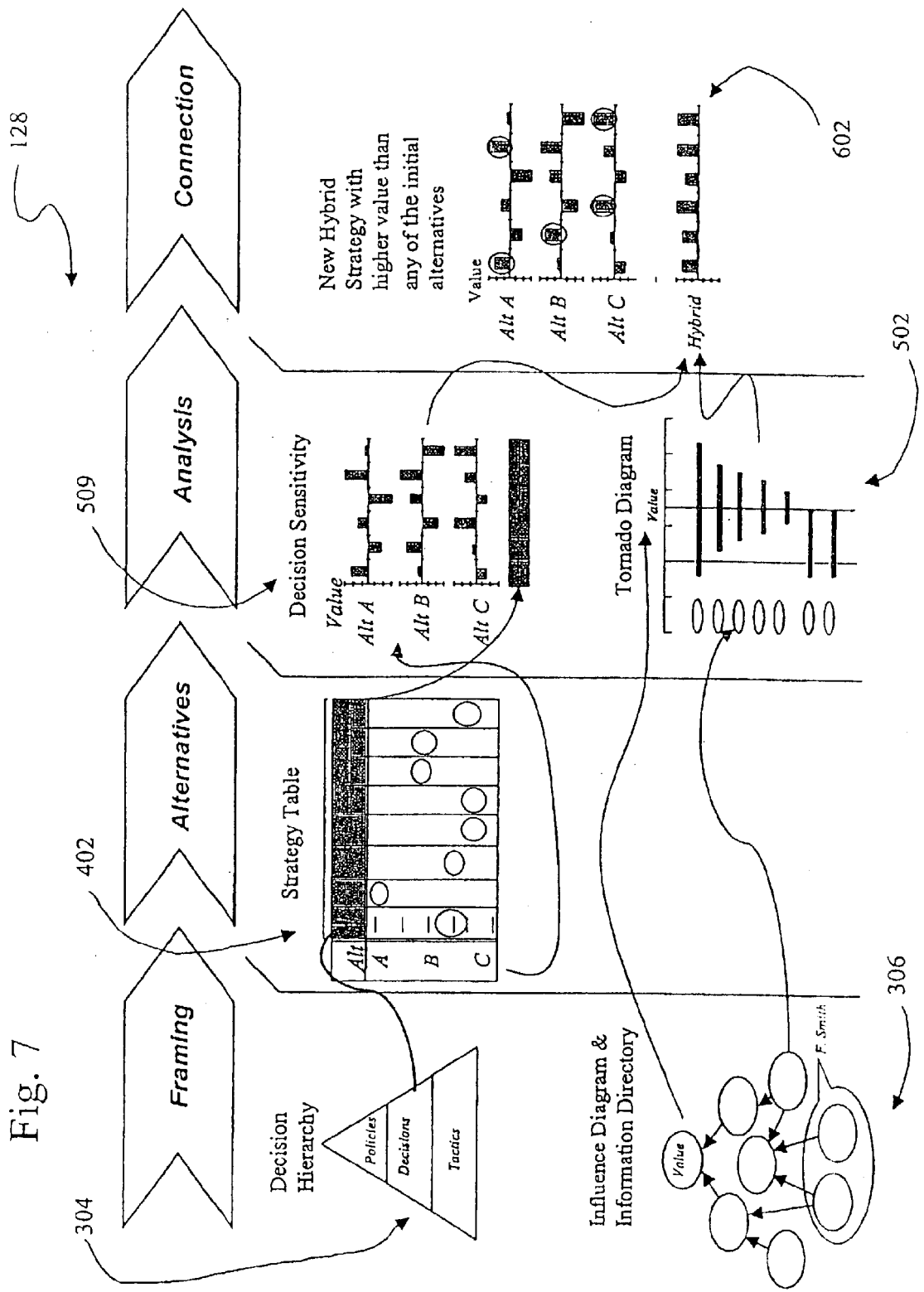
FIG. 7 illustrates the various logical connectivity between the various inputs and outputs of the Framing, Alternatives, Analysis, and Connection logic that comprises the users' interface.

FIG. 7 illustrates the various logical connectivity among the various common displays of the Framing, Alternatives, Analysis, and Connection that comprise the users' interface 128.

FIGS. 8a–i illustrate an example of an application of the various logic components set forth in FIGS. 3–7. As shown, such illustrative application of the collaborative decision platform relates to an individual and his/her spouse, the users, selecting a strategy for participation in an employer's stock purchase program. Initially, the collaborative decision platform executes a decision application selected by the users for developing stock purchase strategies.

In the Framing process, the collaborative decision platform uses input from the decision application to present the users with an initial decision hierarchy, which the users confirm or modify. The collaborative decision platform produces the resulting decision hierarchy 800, shown in FIG. 8a, as an output, which identifies the decisions that are within the scope of the current decision making process.

The collaborative decision platform also uses input from the decision application to present the users with an initial influence diagram, which the users confirm or modify. The influence diagram identifies the critical uncertainties or risks, the decisions and the values that are important to the users, and it displays the relationships among them. The users confirm or modify the influence diagram. The collaborative decision platform produces the resulting influence diagram 802, shown in FIG. 5b, as another output. Note that a directory of information sources 803 is included with the influence diagram.

The users are allowed to modify the influence diagram and the decision hierarchy only to the extent that the modifications were anticipated by the author of the application. This restriction assures that the alternative strategies that are defined in the Alternatives process can be analyzed with the spreadsheet provided by the decision application.

In the Alternatives process, the collaborative decision platform uses input from the decision application to present the users with an initial strategy table that is consistent with the decision hierarchy, which the users confirm or modify. One or more strategy names and their corresponding definitions on the strategy table are also presented to the users.

The users may confirm or modify the strategies, including developing new strategies. The resulting strategy alternatives are displayed on strategy tables 804, as shown in FIGS. 5c and 8d.

Figure 8A:
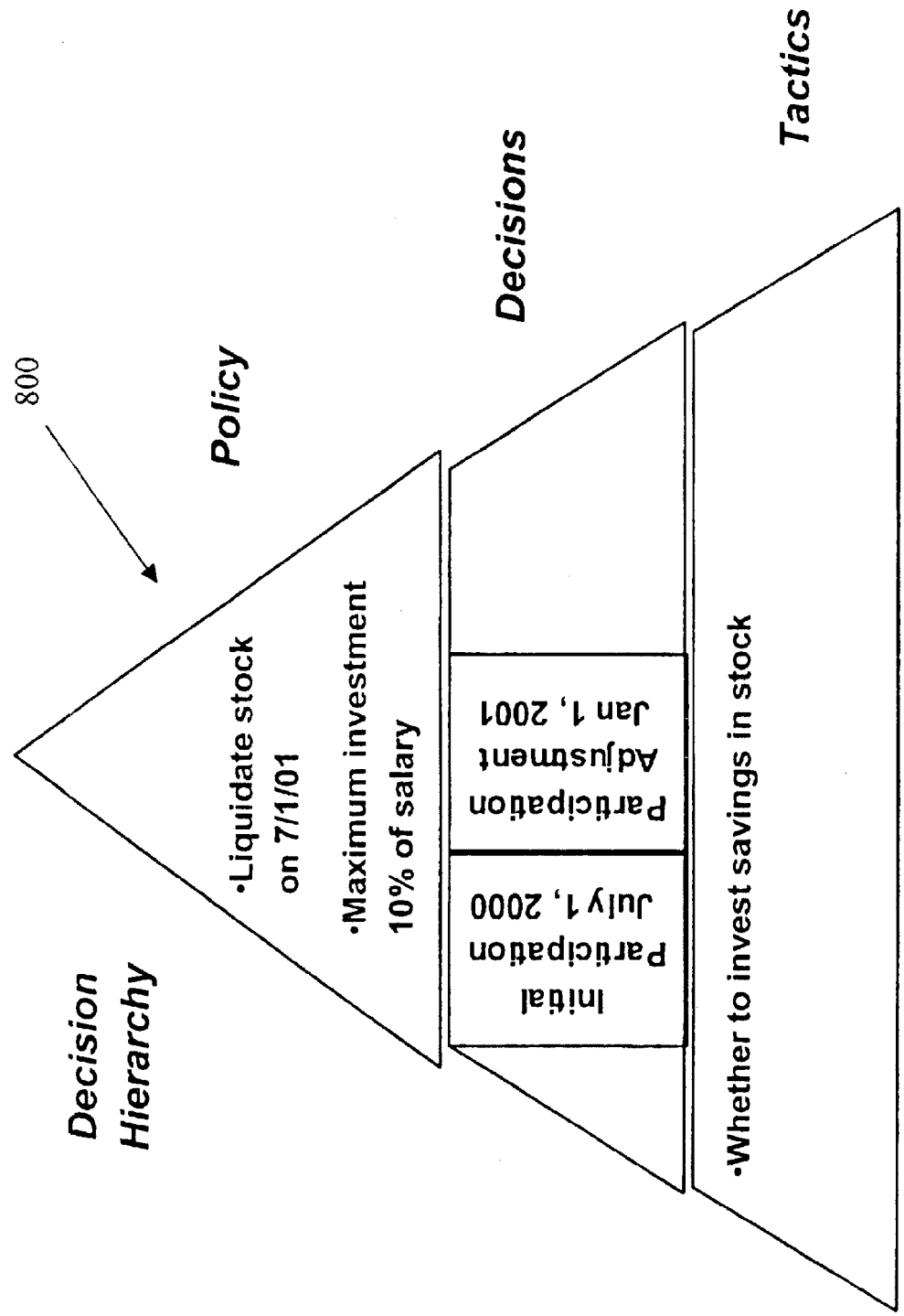
Figure 8B:
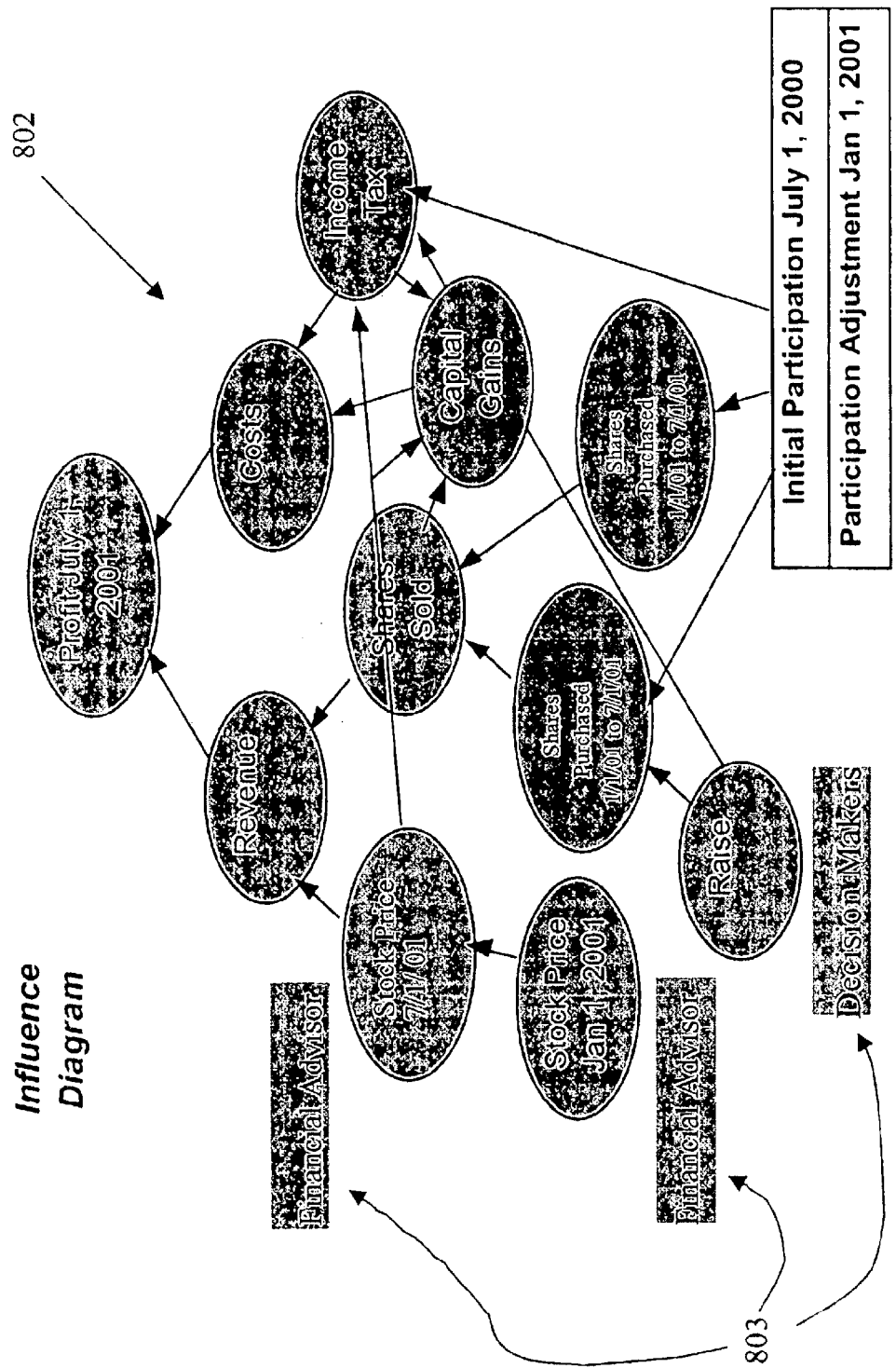
Figure 8C:
Figure 8E:
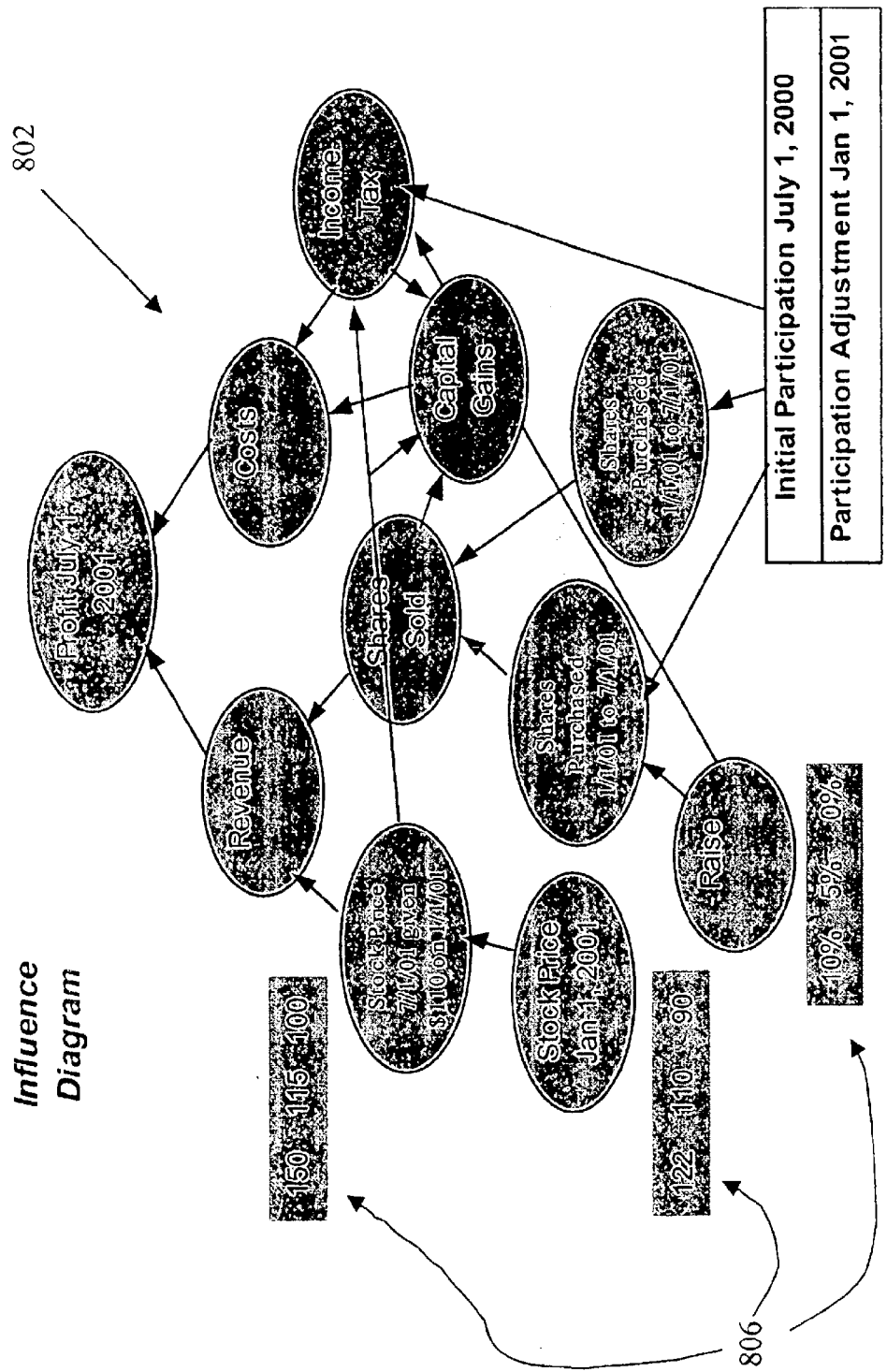
Figure 8F:
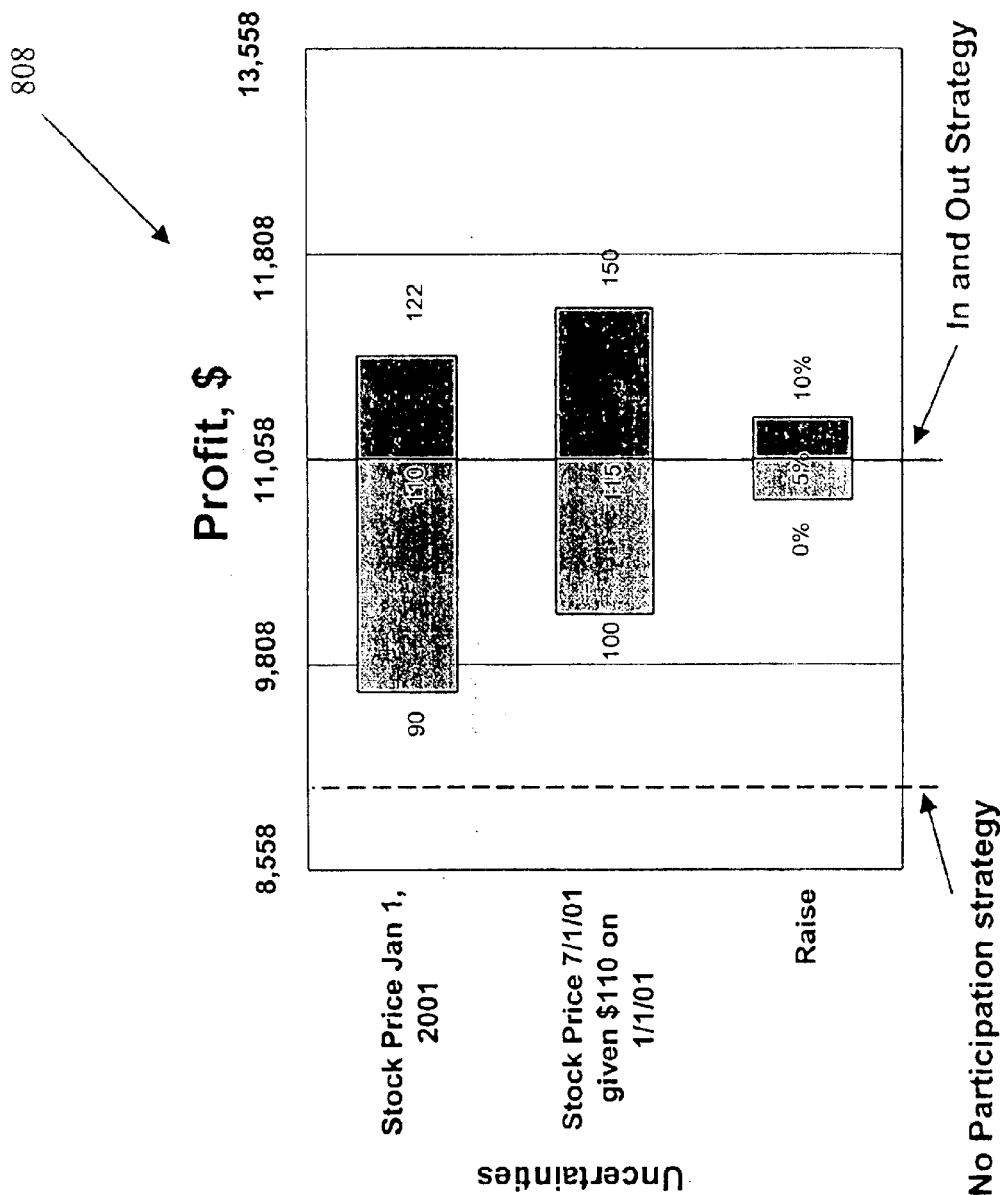
Figure 8G:
Figure 8I:
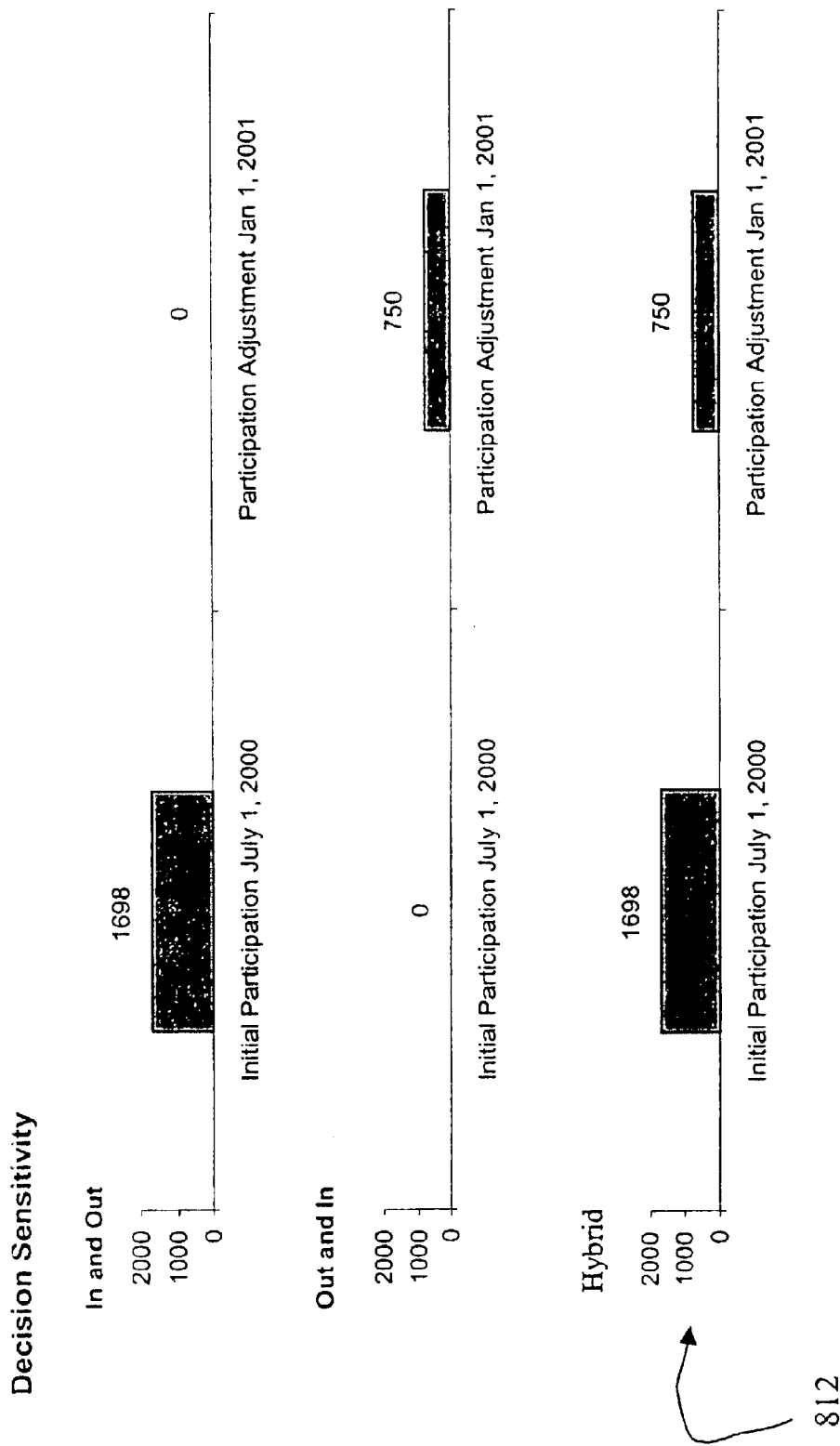

In the Analysis process, ranges on each uncertainty or risk 806, as shown in FIG. 8e, are input from the specified decision-relevant databases 803 of FIG. 8b. The users may confirm or modify the ranges. The collaborative decision platform takes as input the spreadsheet residing in the decision application that includes equations and data relating the decisions and uncertainties to the value, which in this case is profit. The collaborative decision platform uses the spreadsheet, strategies and uncertainty ranges to produce the tornado diagram 808 and decision sensitivity 810 shown in FIGS. 8f and 8g.

In the connection process, the users define on the strategy table 804 a new, more valuable "hybrid" strategy 811 that combines the most valuable alternatives from each of the initially defined alternative strategies, as shown in FIG. 8b. In defining this hybrid strategy, the users are relying heavily on the shared insight and understanding from the tornado diagram and decision sensitivity. The collaborative decision platform uses the spreadsheet from the decision application to calculate the value of the hybrid 812, as shown on FIG. 8l.

Figure 9:
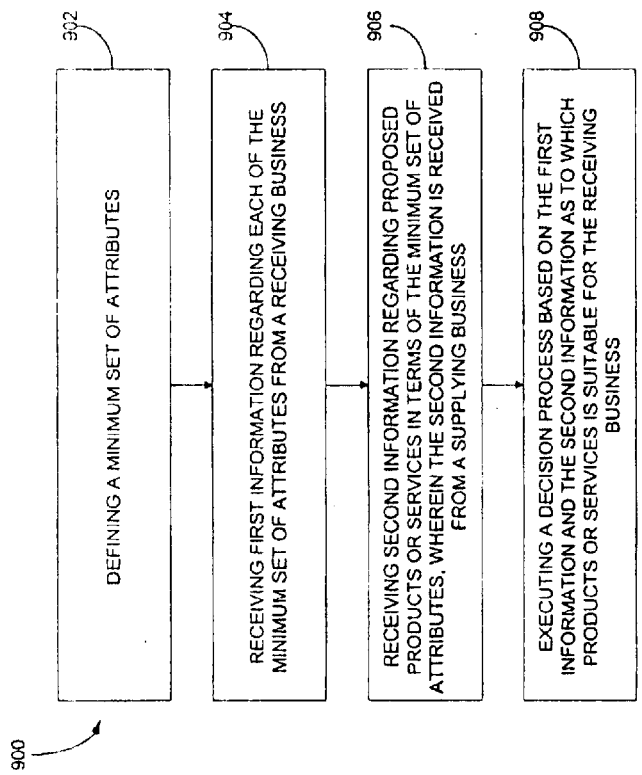
FIG. 9 illustrates a method for affording customer-centric collaborative decision making in a business-to-business framework.

FIG. 9 illustrates a method 900 for affording customer-centric collaborative decision-making in a business-to-business framework. In one embodiment, the method 900 may be carried using the collaborative decision platform set forth hereinabove. In the alternative, the present method may be executed using any other desired architecture.

Initially, in operation 902, a minimum set of attributes is defined. Thereafter, first information regarding each of the minimum set of attributes is received from a receiving business. Note operation 904. Second information is then received regarding proposed products or services in terms of the minimum set of attributes, as indicated in operation 906. Such second information is received from a supplying business.

In use, a decision process is executed based on the first information and the second information as to which products or services is suitable for the receiving business. Note operation 908. The present embodiment thus provides a customer-centric collaborative protocol that defines the minimum informational requirement for collaborative decision-making between enterprises (B2B).

The customer-centric collaborative protocol exploits a commonality in the attributes of the value structure of many enterprises that is sufficient to assess the implications of many decisions. An illustrative minimum set of attributes could include: price, sales, variable cost, fixed cost and investment. For many strategic decisions, knowing the affect of the decision on these attributes enables the enterprise to make an informed decision.

Figure 9A:
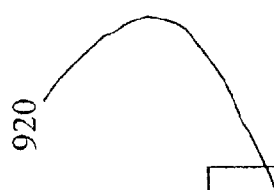
FIGS. 9a and 10 illustrates tables associated with the method of FIG. 9.

There are well-defined algorithms for the hierarchical expansion of each of the attributes in the minimum set in the event additional detail is required. When more detail is required, it may be nested within the higher level attributes. An expanded set of attributes could include; price, market share, market size, labor cost, material cost, administrative cost, annual expenses, working capital, plant and equipment, etc. The protocol or structure of the informational requirement is identical for a wide range of enterprises and many decisions within those enterprises, but the relative value of each attribute will be different. FIG. 9a illustrates a table 920 showing various customer-centric collaborative ($C^3$) attributes, and the value of a one-percent increases of such attributes in two different industries.

Figure 10:
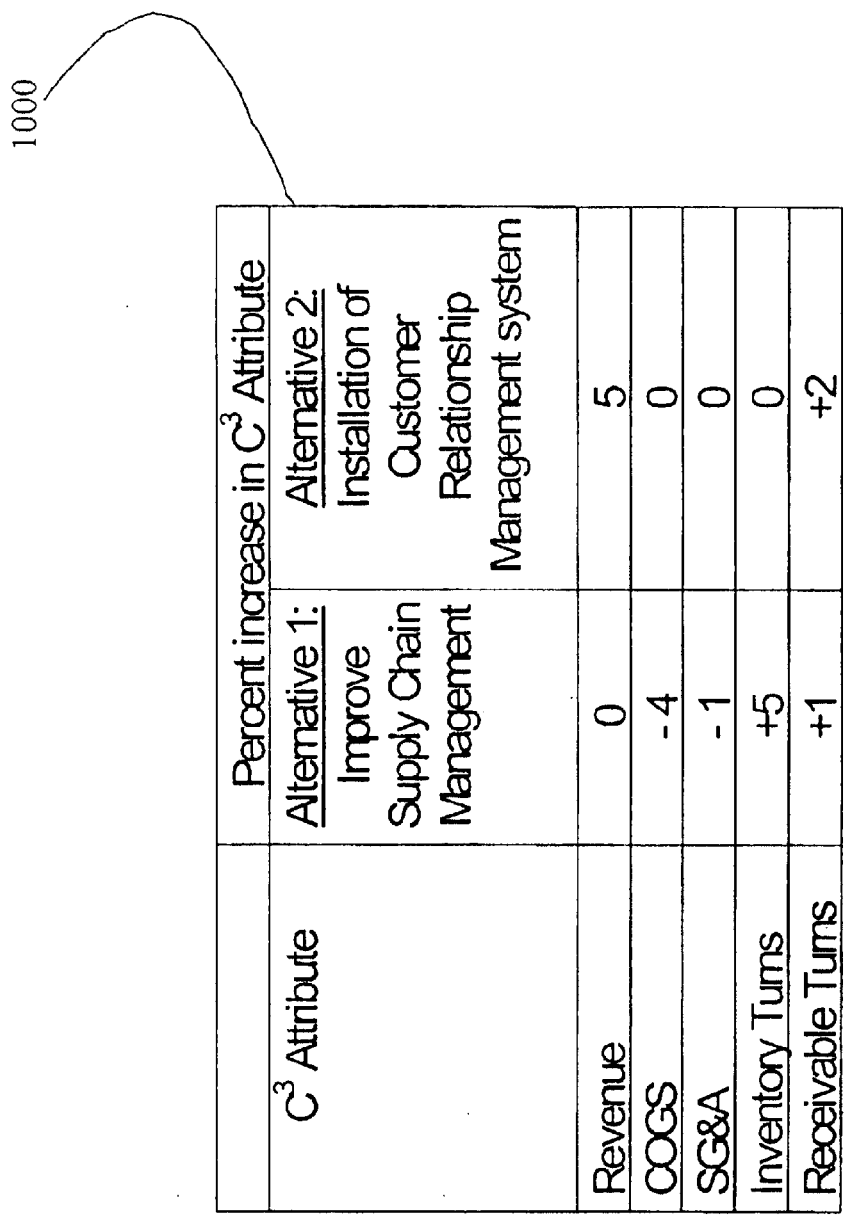

In accordance with the present invention, the supplying enterprise is required to describe its alternatives in terms of their effect on the value attributes that matter to the receiving enterprise. FIG. 10 illustrates a table 1000 showing such an effect on the value attributes.

Figure 11:
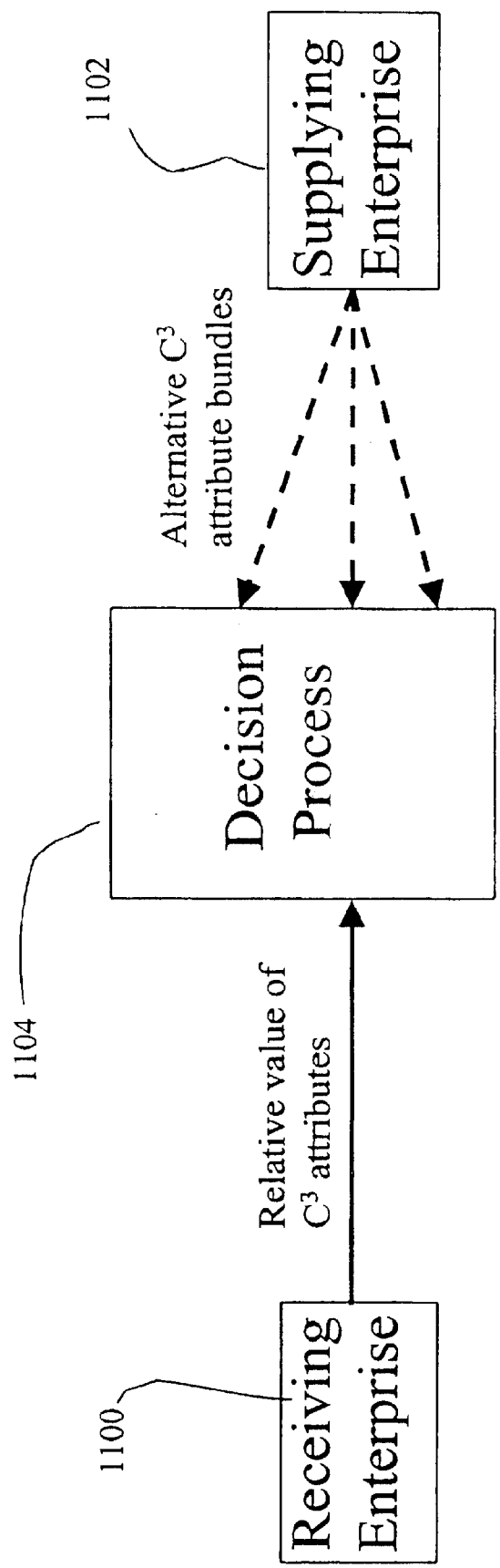
FIG. 11 is a schematic diagram showing the customer-centric collaborative protocol.
Figure 12:
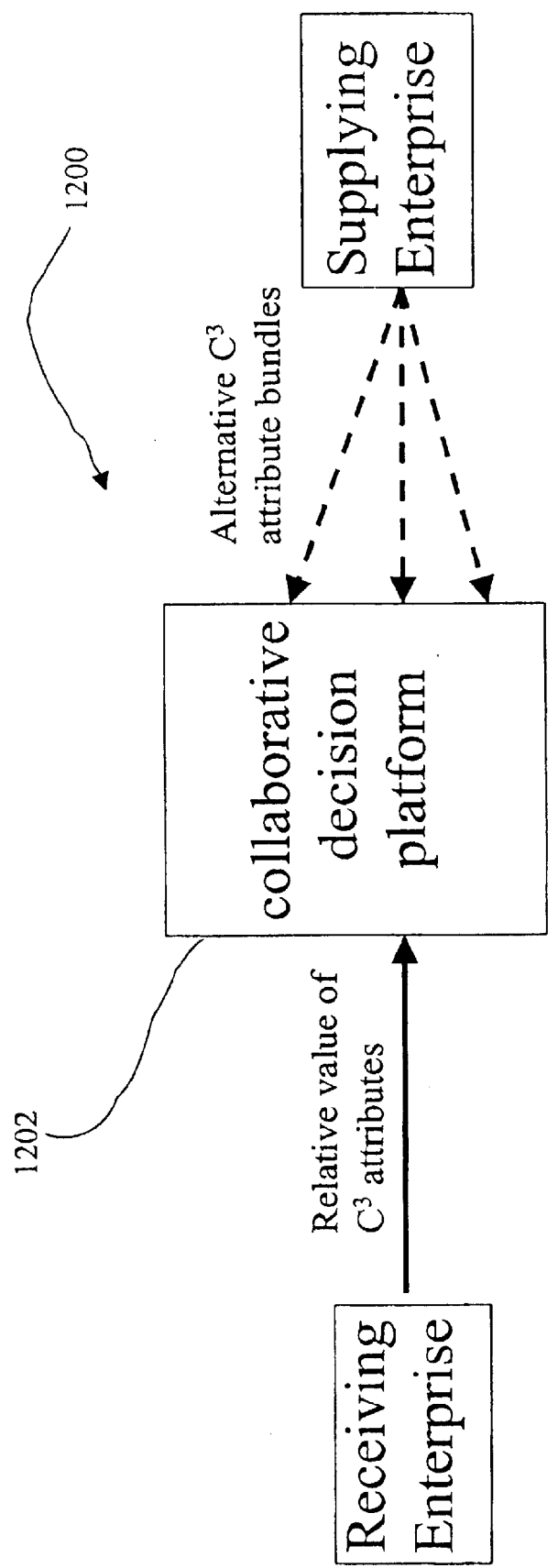
FIG. 12 illustrates a first example of the embodiment set forth in FIG. 11.

FIG. 11 is a schematic diagram showing the customer-centric collaborative ($C^3$) protocol. As set forth hereinabove, the protocol defines the minimum informational requirement for decision making between enterprises (B2B). The value of improvements of each of the attributes is specified for a receiving enterprise 1100. It should be noted that attributes are easily calculable for enterprises that focus on profit. However, even for enterprises that are not focused on profit, these same attributes are of critical importance. A supplying enterprise 1102 provides one or more alternative "attribute bundles" that describe products and services it is willing to deliver in terms of the attributes that matter to the receiving enterprise. An attribute bundle specifies how much of each attribute will be provided. It should be understood that the attribute levels can be assessed with little difficulty, using for example an influence diagram. A decision module 1104 may then execute the method 900 of FIG. 9. FIG. 12 illustrates a first example 1200 of the embodiment set forth in FIG. 11. As shown, an industry independent, open and scalable platform may be provided that uses the customer-centric collaborative protocol for real-time, remote collaborative decision making among enterprises. The customer-centric collaborative protocol can be used with an architecture or process that supports collaborative decision-making, such as a collaborative decision platform 1202 which is similar to that set forth hereinabove.

Figure 13:
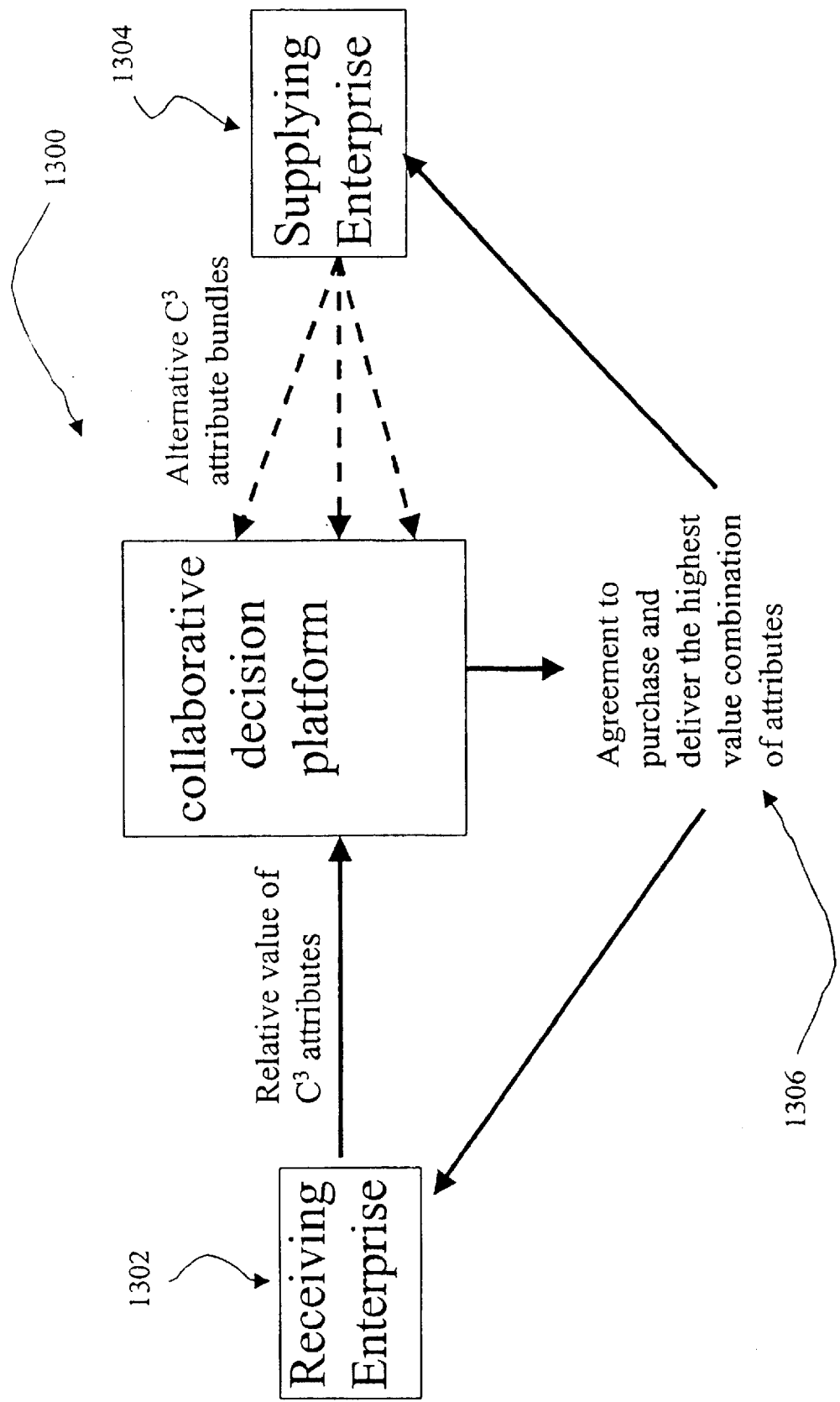
FIG. 13 illustrates a second example of the embodiment set forth in FIG. 11.
Figure 14:
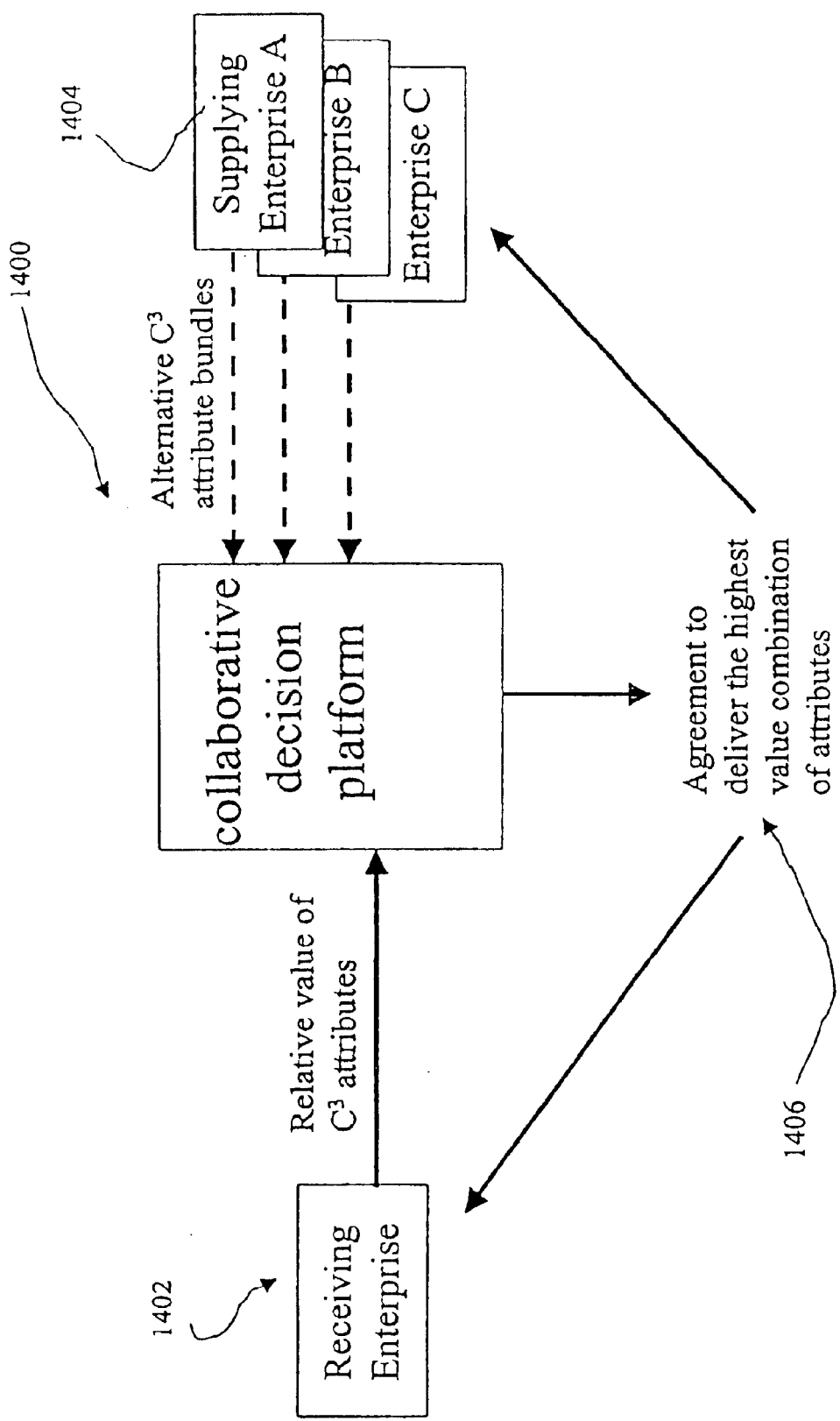
FIGS. 14 and 15 illustrate third and fourth examples, respectively, of the embodiment set forth in FIG. 11, where an industry independent, open and scalable platform is provided for business-to business exchange of existing goods and services that are not commodities.

FIGS. 13 and 14 illustrate a second and third example 1300 and 1400 of the embodiment set forth in FIG. 11. In the embodiment of FIG. 13, the customer-centric collaborative protocol and an architecture or process that supports collaborative decision making, such as the collaborative decision platform, may together enable an open, scalable, industry independent process for real-time, remote decision-making between a receiving enterprise 1302 and a supplying enterprise 1304. As shown, the present embodiment may serve to negotiate an agreement 1306 to purchase and deliver the highest value combination of attributes. In a third embodiment shown in FIG. 14, the customer-centric collaborative protocol and an architecture or process that supports collaborative decision making, such as the collaborative decision platform, may together enable an open, scalable, industry independent process for real-time, remote decision-making among a receiving enterprise 1402 and supplying enterprises 1404. As shown, the present embodiment may serve to negotiate an agreement 1406 to purchase and deliver the highest value combination of attributes.

Figure 15:
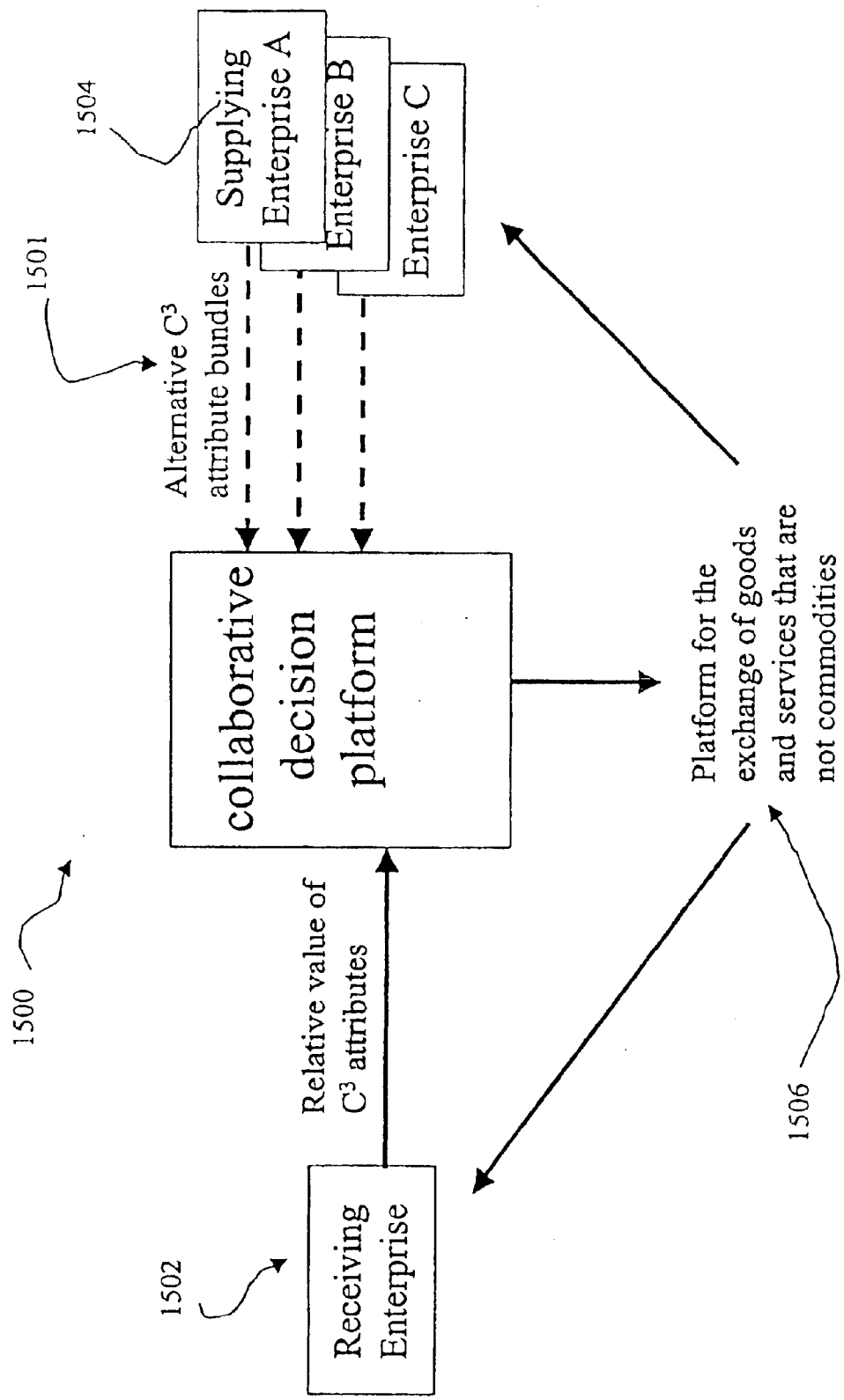

FIG. 15 illustrates a fourth examples 1500 of the embodiment set forth in FIG. 11, where an industry independent, open and scalable platform is provided for B2B exchange of existing goods and services that are not commodities. In other words, an effective platform for a non-commodity exchange is afforded.

As shown in FIG. 15, the alternative attribute bundles 1501 can be offered by different enterprises 1504 and need not be commodities, but rather may differ on the level offered of every attribute. It should be understood that commodities are goods and services that can be defined without the information about or the interaction of the customer. As shown in FIG. 15, the customer-centric collaborative protocol and an architecture or process that supports collaborative decision making, such as the collaborative decision platform, together enable an industry-independent, open and scalable platform for the real-time B2Bexchange of existing goods and services 1506 that are not commodities.

Figure 16:
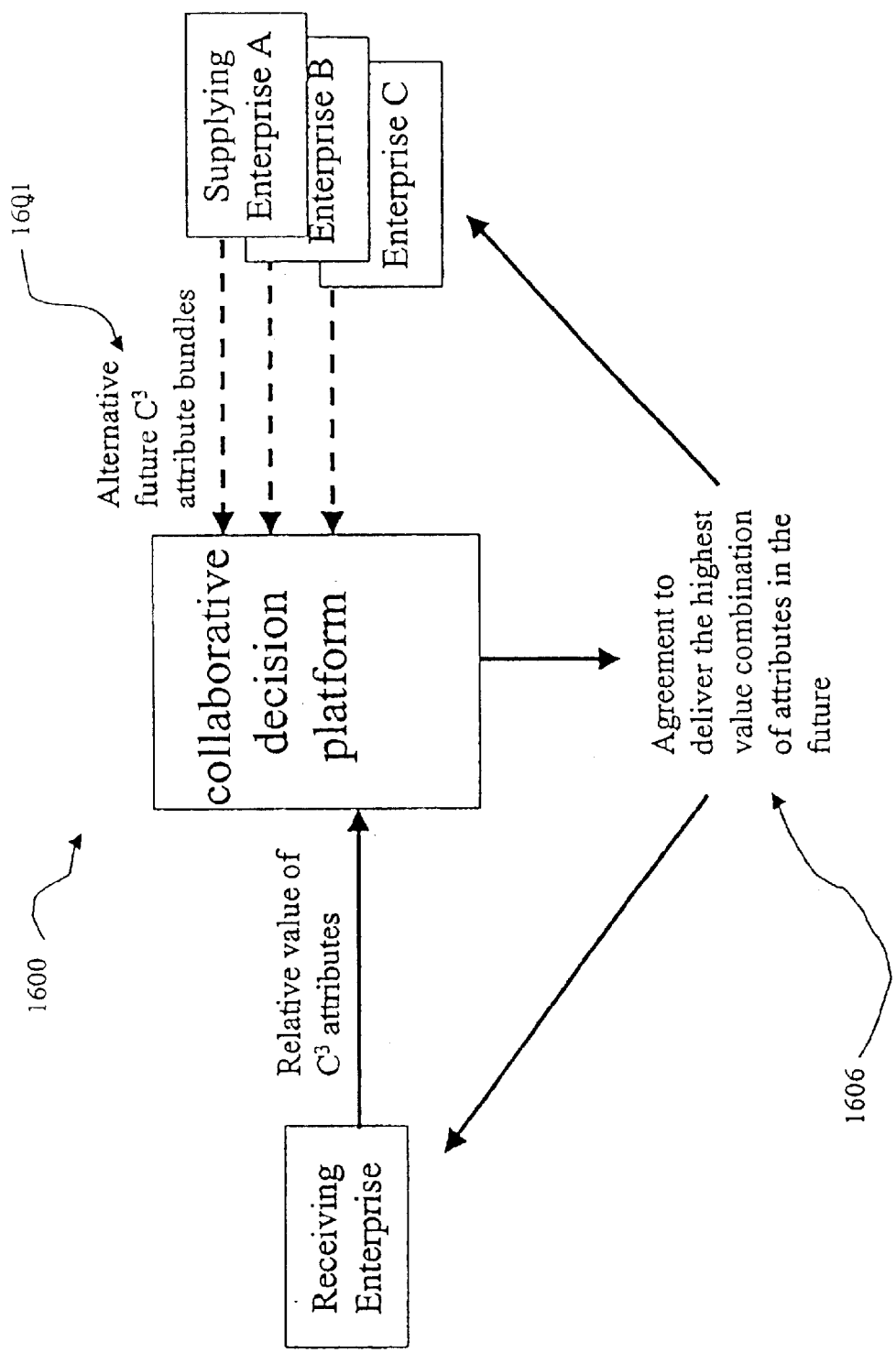
FIG. 16 illustrates a fifth example of the embodiment set forth in FIG. 11, where an industry independent, open and scalable platform is provided for B2B real-time collaboration in the definition of future, nonexistent goods and services.
Figure 17:
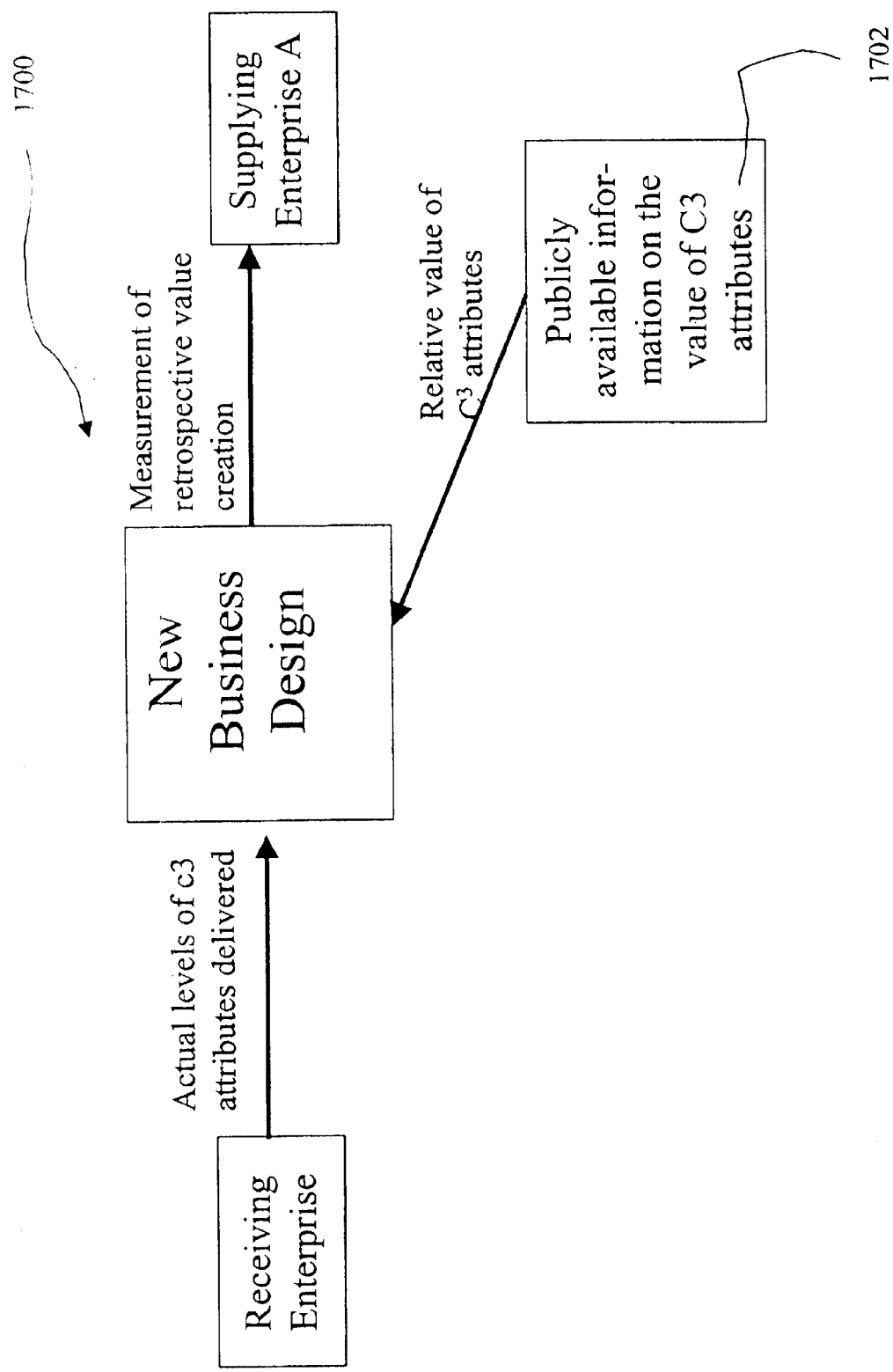
FIGS. 17 and 18 illustrate sixth and seventh examples, respectively, of the embodiment set forth in FIG. 11, where a new business design is provided that assists business-to-business enterprises in measuring the value creation for its customers.
Figure 18:
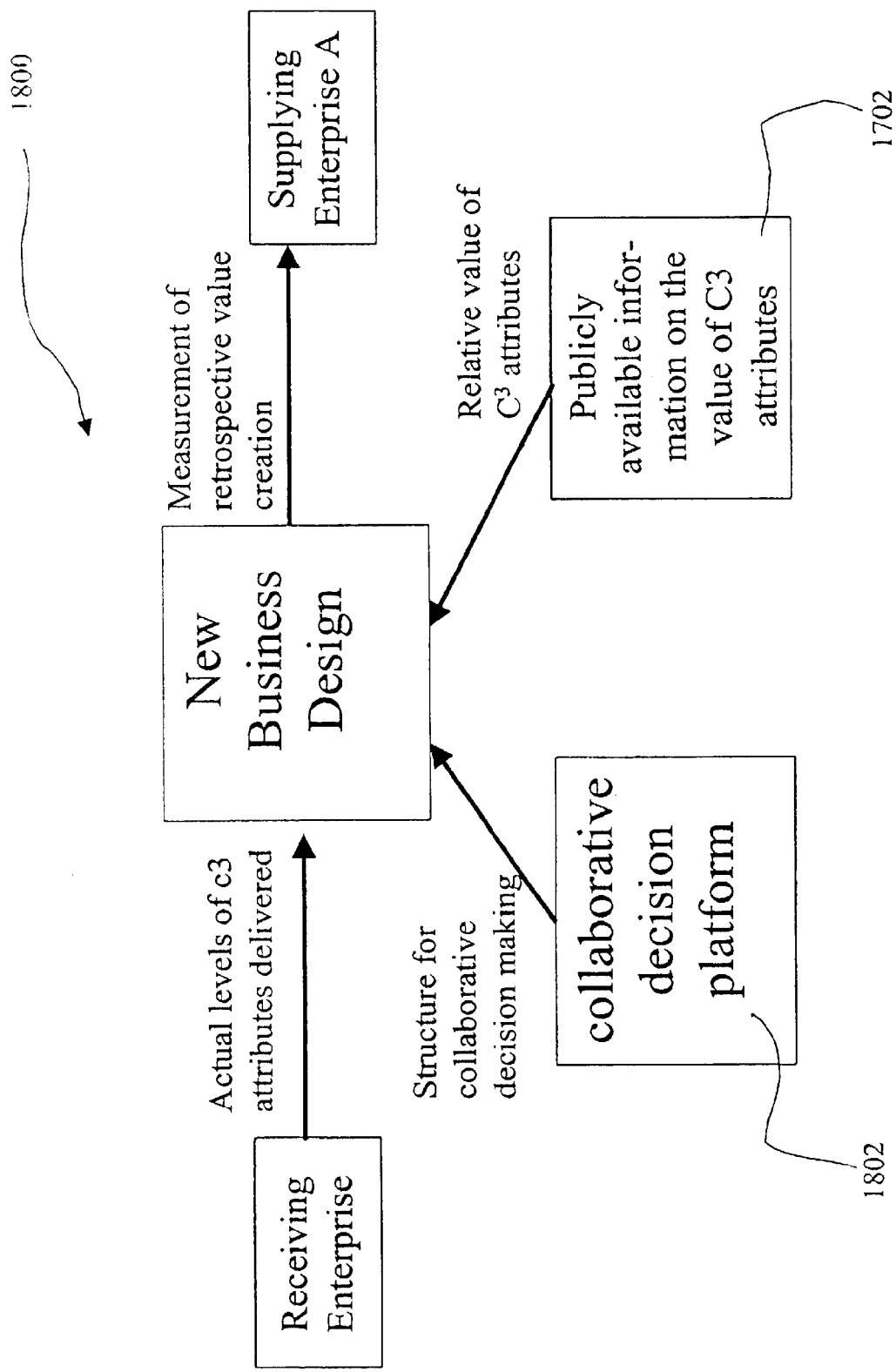

FIG. 16 illustrates a fifth example 1600 of the embodiment set forth in FIG. 11, where an industry independent, open and scalable platform is provided for B2Breal-time collaboration in the definition of future, non-existent goods and services. As shown in FIG. 16, the alternative attribute bundles 1601 can be offered by different enterprises and need not exist. Rather, they may represent proposals to deliver goods and services that could be developed in the future. As shown, an agreement 1606 may be negotiated to deliver the highest value combination of attributes in the future. FIGS. 17 and 18 illustrate sixth and seventh examples 1700 and 1800, respectively, of the embodiment set forth in FIG. 11, where a new business design is provided that assists B2B enterprises in measuring the value creation for its customers.

As shown in FIG. 17, the customer-centric collaborative protocol and publicly available information 1702 may together enable a new business design that assists B2B enterprises in measuring the prospective value creation for its customers. With reference to FIG. 18, a particular embodiment of that business design could include the customer-centric collaborative protocol, publicly available information and a collaborative decision platform 1802, which together enable a new business design that assists B2B enterprises in measuring the retrospective value creation for its customers.

An exemplary application of a customer-centric collaborative protocol utilizing the collaborative decision platform for the selection of a strategy for "Customer Relationship Management (CRM)" will now be set forth. In particular, the present B2B example relates to a receiving enterprise desirous of an improved CRM strategy and a supplying enterprise capable of delivering alternative CRM strategies.

Figure 19:
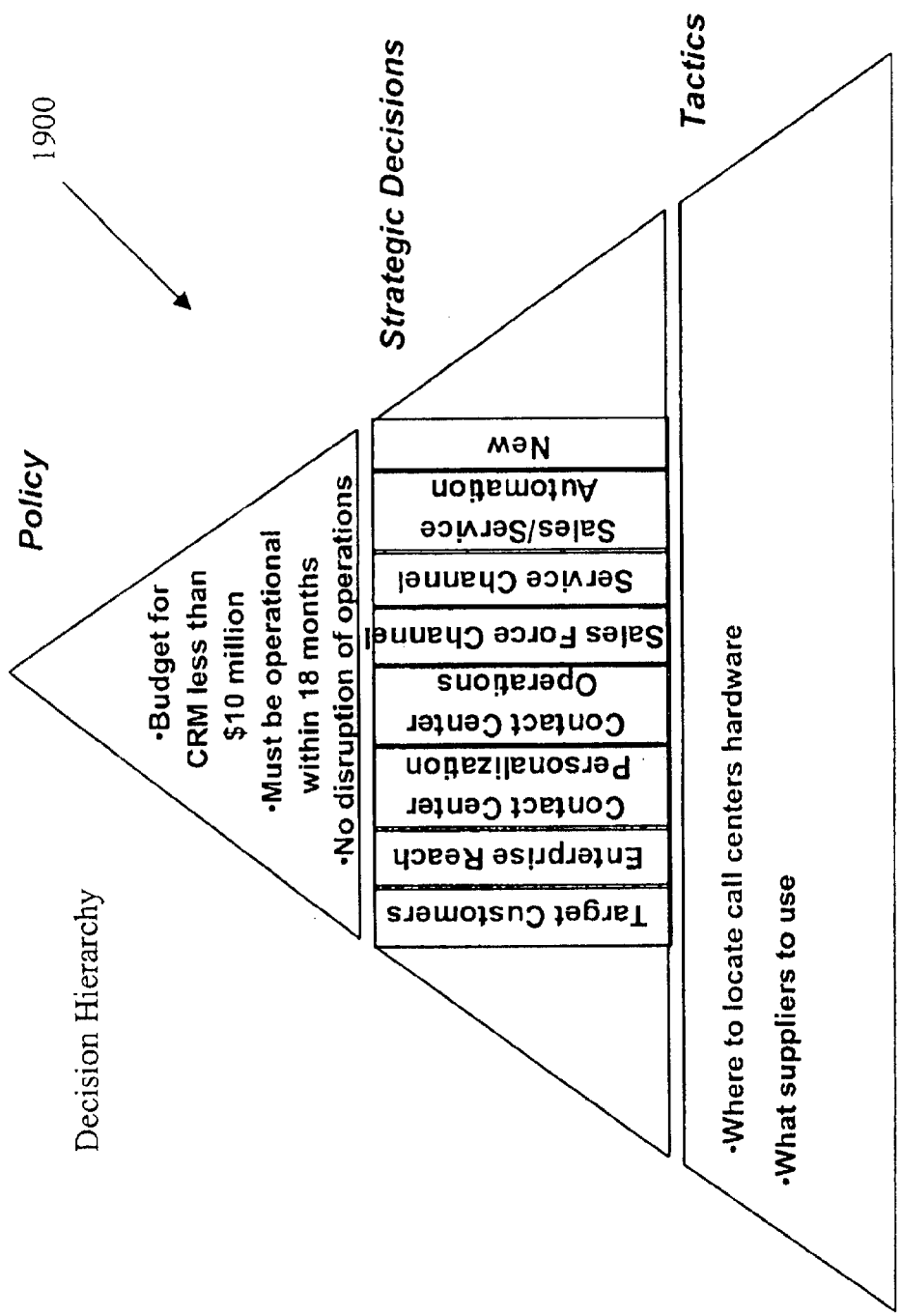
Figure 20:
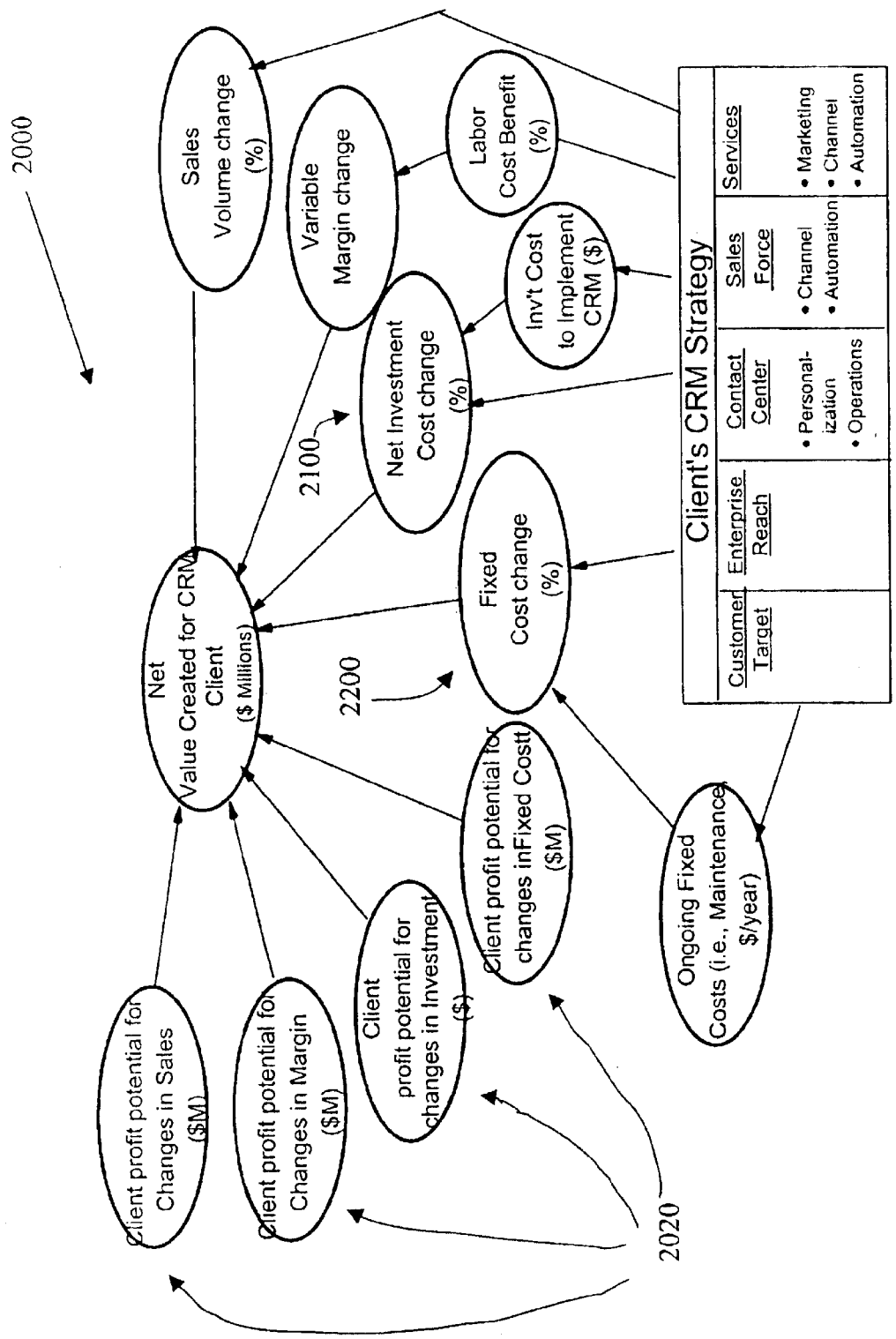
Figure 21:
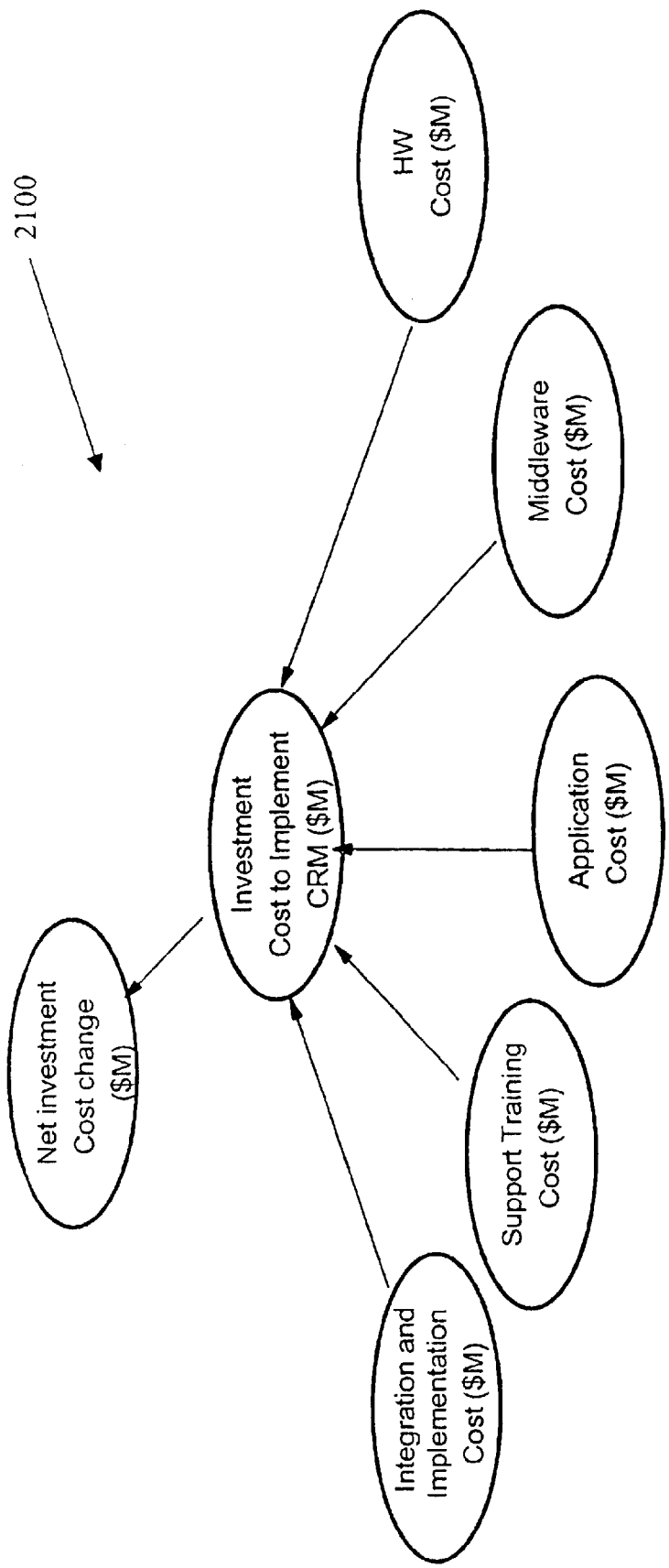
Figure 22:
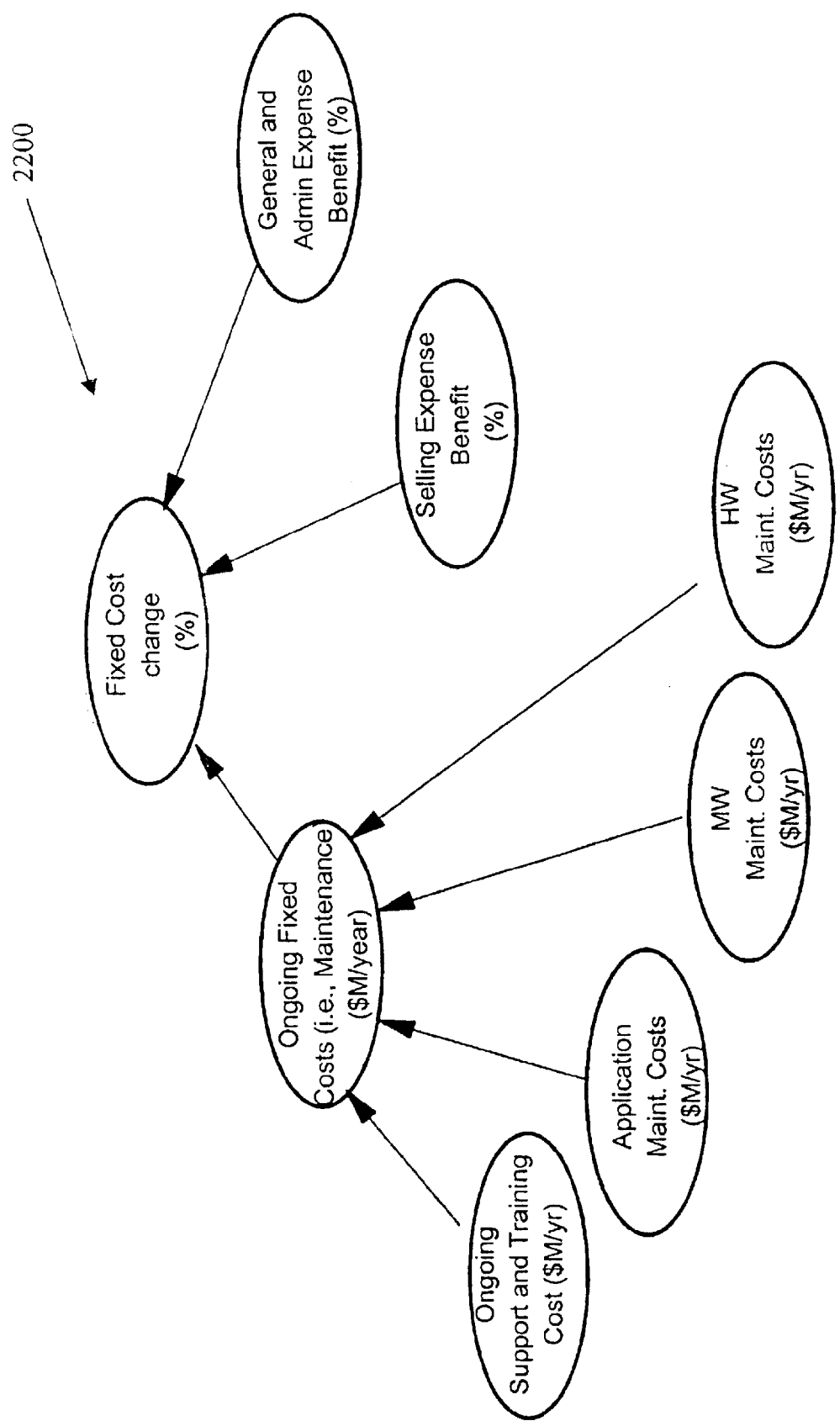

In this case during the Framing process, the receiving enterprise provides the policies, which constrain the strategic alternatives. The supplying enterprise demonstrates its experience by offering a list of strategic decisions. The receiving enterprise believes that two of the decisions are tactical, i.e. can be made later. FIG. 19 illustrates the resulting decision hierarchy 1900 developed collaboratively and asynchronously. FIG. 20 shows the influence diagram 2000, which identifies the critical uncertainties, the strategic decisions and the attributes 2020 that are of value to the receiving enterprise and which display the relationship among them. For two of the attributes, more detail is required and the higher level attributes are expanded hierarchically in those areas 2100 and 2200, as shown in FIGS. 21 and 22, respectively.

During the Alternatives process, three alternative strategies 2300, 2302, and 2304 are defined collaboratively on a strategy table in terms of the strategic decisions, as shown in FIGS. 23a, 23b and 23c, respectively. The strategy table is developed remotely and asynchronously. The strategies are developed in the physical presence of both enterprises.

Figure 24:
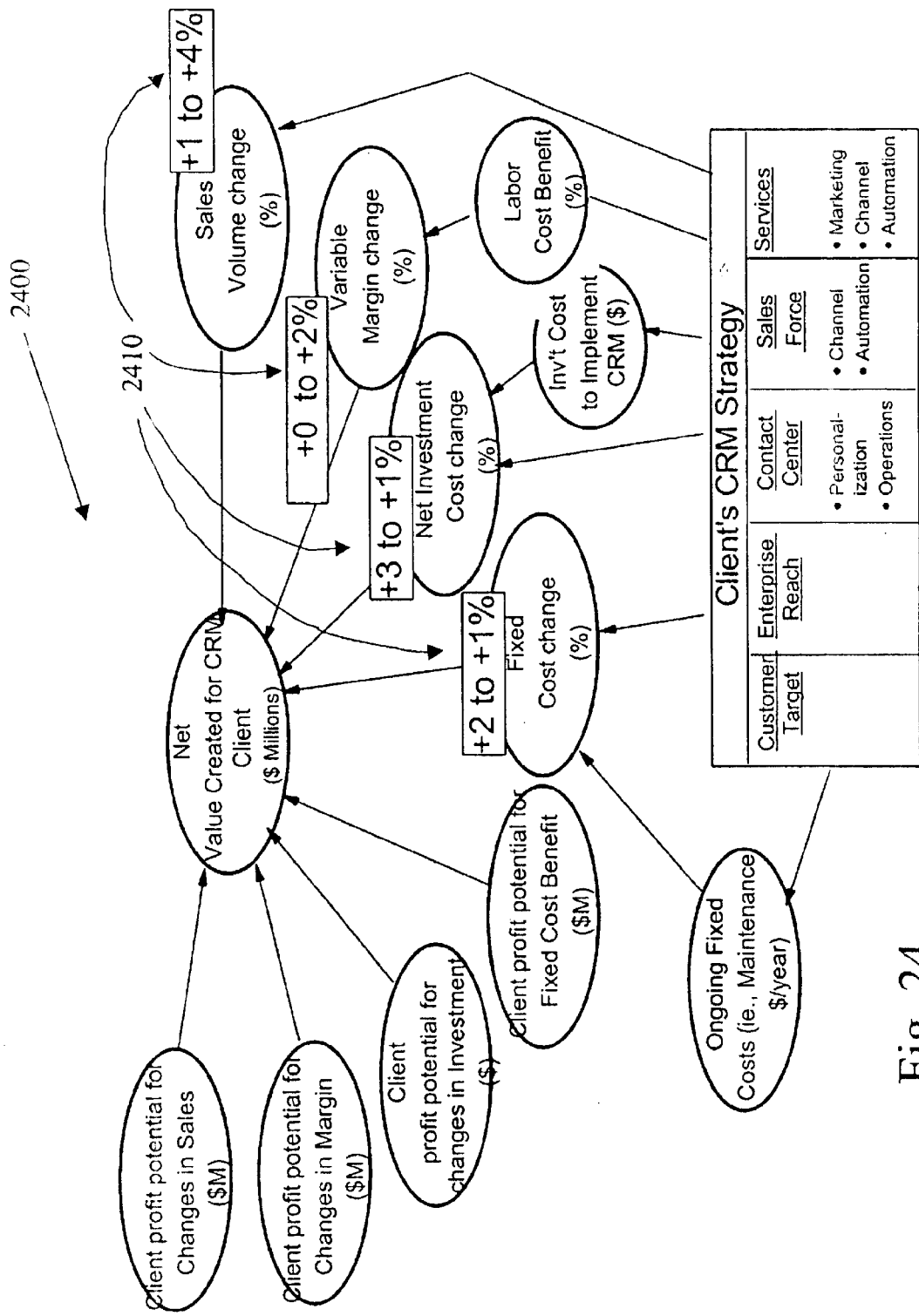

In the Analysis process, the supplying enterprise uses information from its database to assess the range of effect that the "Revenue Growth" strategy will have on each of the attributes 2410. Note 2400 in FIG. 24. Similar assessments are made for each of the other strategies. The receiving enterprise may establish its value for changes in each of the attributes as shown in the table 2500 of FIG. 25.

The table 2600 in FIG. 26 shows the calculations performed inside the collaborative decision platform when the customer-centric collaborative protocol is used. As shown, the value of an alternative to the client can be estimated by multiplying the improvement in each attribute by the customer's value for changes in that attribute.

Figure 27:
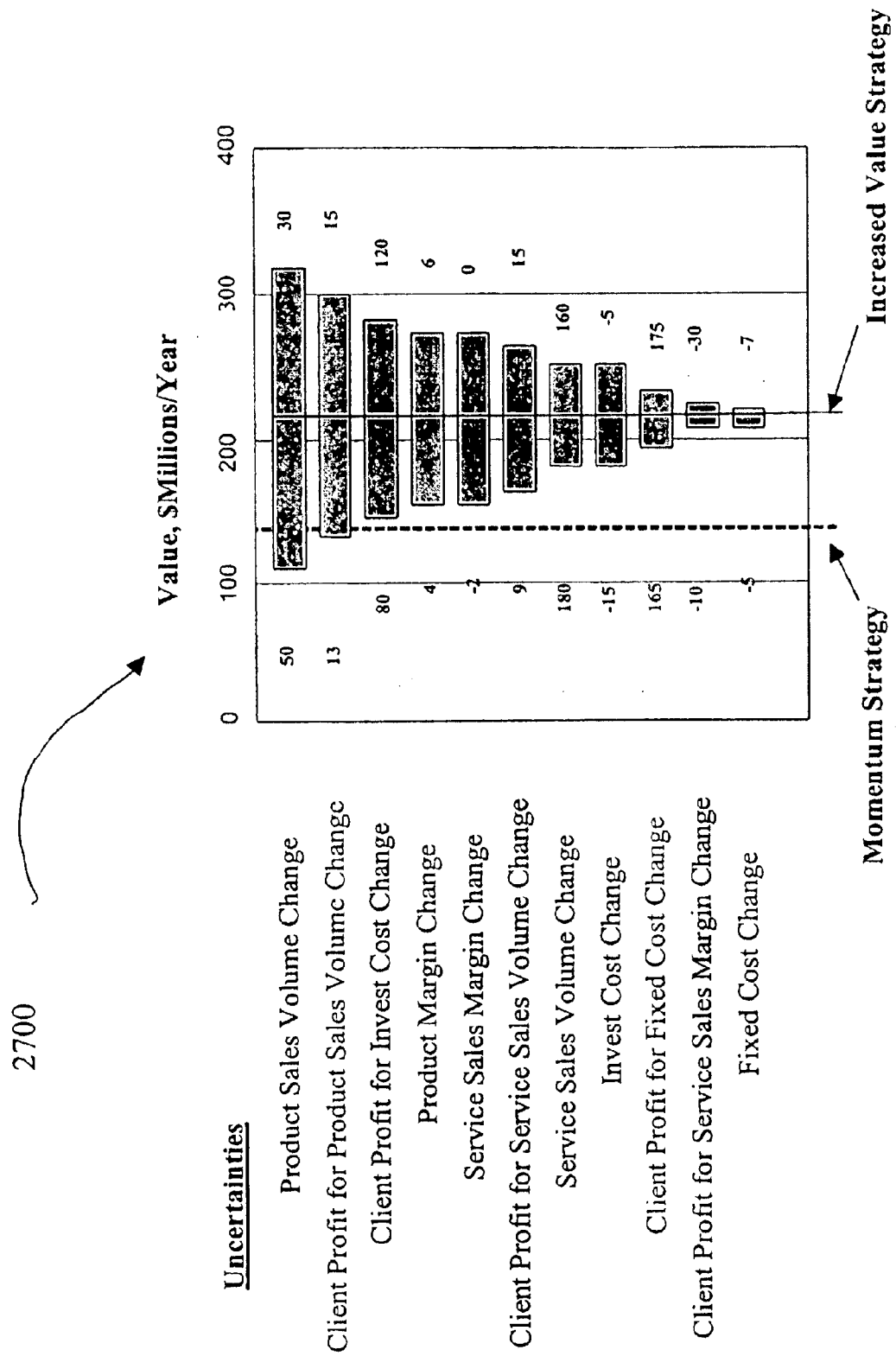
Figure 28:
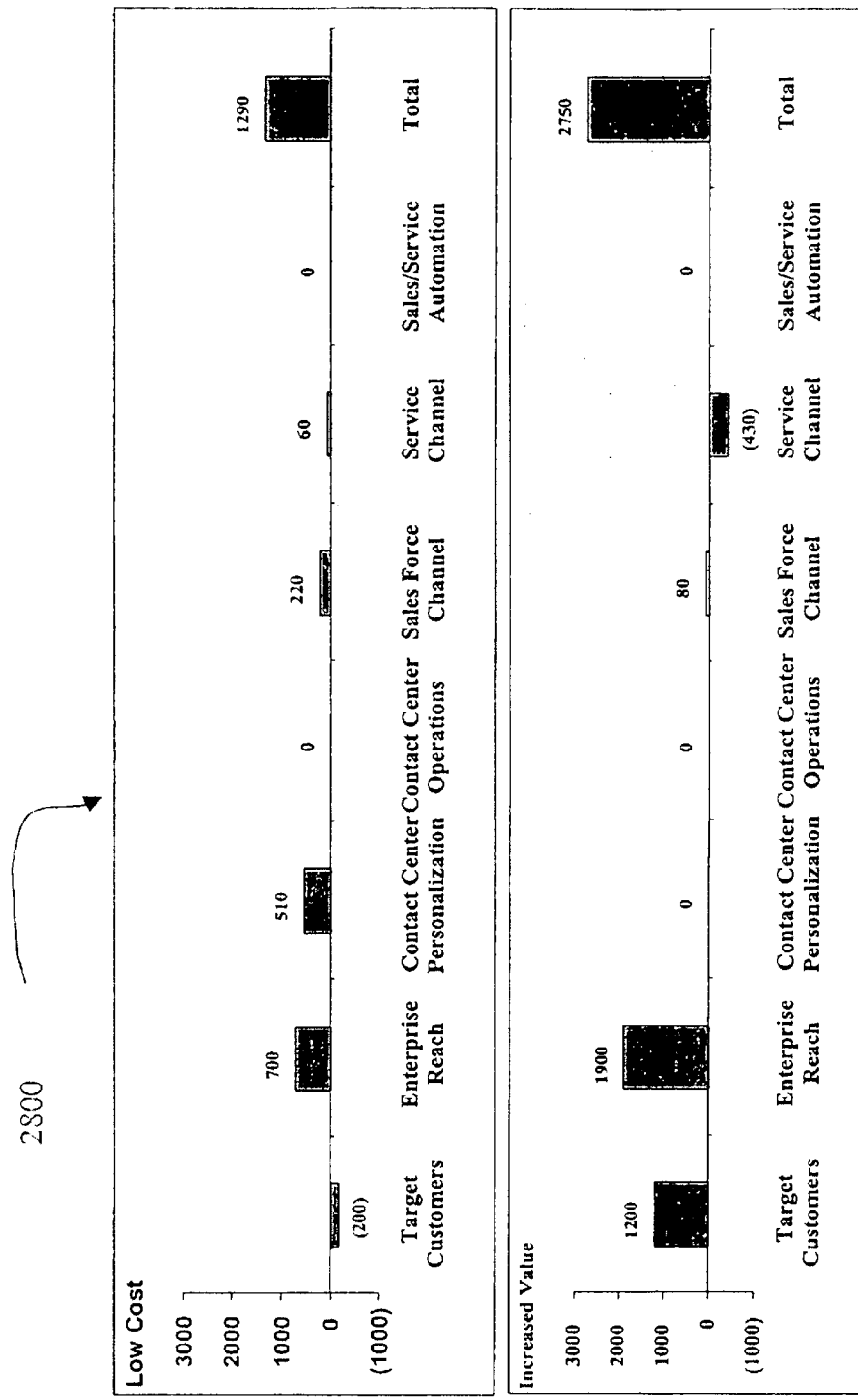

The remarkable simplicity of these calculations enables shared insight into the sources of risk and sources of value, which is displayed in the tornado diagram 2700 and decision sensitivity 2800 for each of the alternative strategies, as shown in FIGS. 27 and 28, respectively. It should be noted that different solutions might be appropriate for clients in different industries because of different client values for the $C^3$ attributes.

Figure 30:
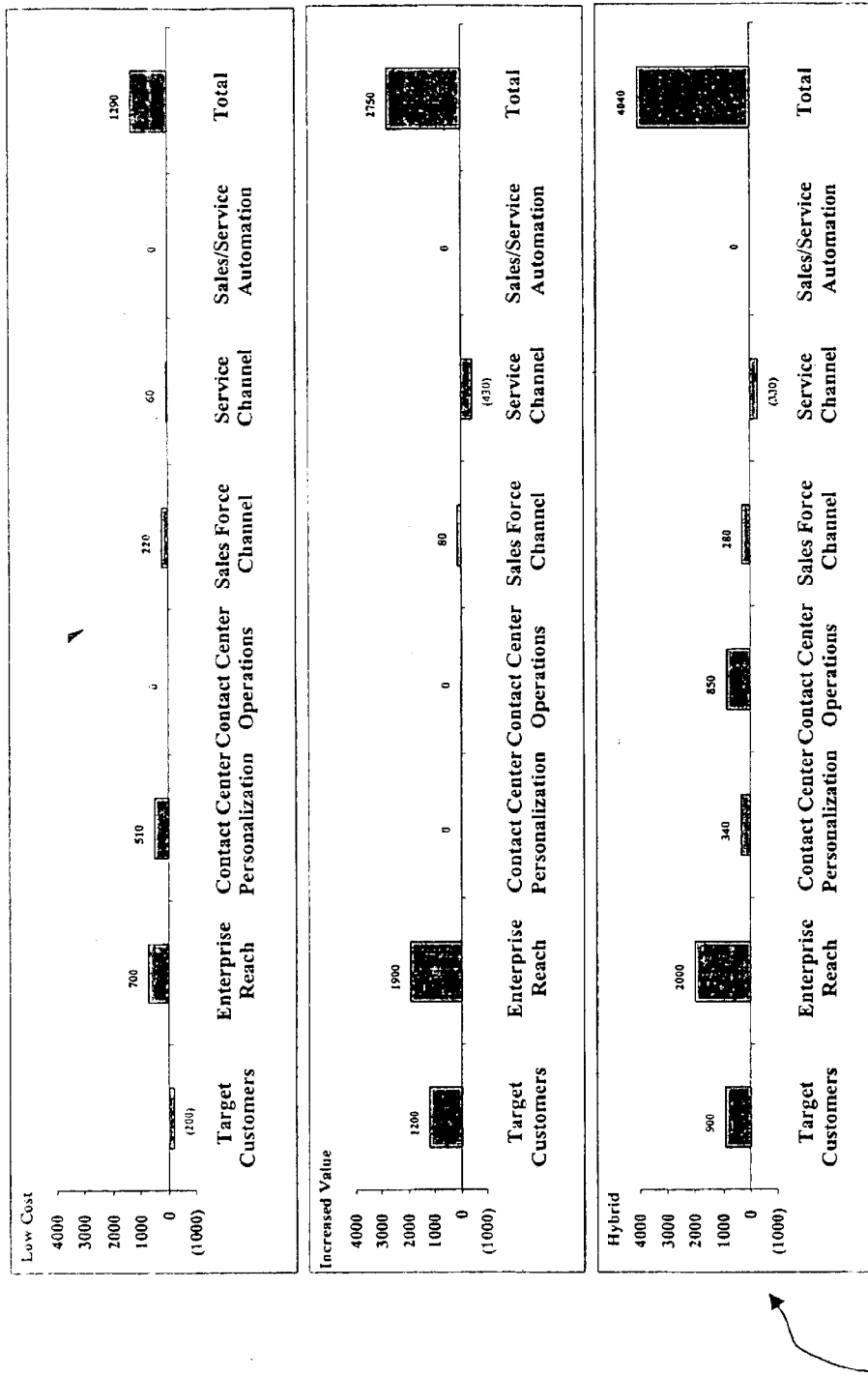

Using the shared understanding of the sources of risk and value in the initially defined alternative strategies, the supplying and receiving enterprise collaborate in developing a new, more valuable "hybrid" strategy 2900, as shown in FIG. 29. Its corresponding decision sensitivity 3000 of FIG. 30 compares the total value of the hybrid strategy with the initially defined alternatives and identifies its sources of value.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a collaborative decision platform adapted to run on a computer, comprising:
    (a) executing an application capable of performing decision logic;
    (b) retrieving information from a database in accordance with the decision logic;
    (c) receiving information from a user in accordance with the decision logic utilizing a user interface;
    (d) processing the information utilizing the decision logic;
    (e) collecting data, wherein the data includes (i) policies that form boundary conditions associated with the decision logic, (ii) strategic decisions to be made, (iii) values that are important to the user, (iv) uncertainties that impact the values, and a relationship between (i)–(iv);
    (f) creating a strategy table using the data;
    (g) assessing the uncertainties for analysis purposes; and
    (h) generating a tornado diagram and decision sensitivity output displays:
    (i) wherein (a)–(d) are carried out by a collaborative decision platform capable of accomplishing (b)–(d) for different purposes by executing different applications each capable of performing different decision logic;
    (j) wherein the decision logic provides a hybrid strategy;
    (k) wherein an application interface provides an interface between the application and the collaborative decision platform, where (b)–(d) are carried out using universal modules capable of interfacing with different applications adapted for applying the universal modules to different business sectors;
    (l) wherein the collaborative decision platform communicates with the application through a standard interface protocol.

2. The method as recited in claim 1, wherein the business sectors include real estate, medicine, corporate.

3. The method as recited in claim 1, wherein the information is retrieved and received via a network.

4. The method as recited in claim 3, wherein the network is the Internet.

5. The method as recited in claim 1, wherein the purpose is selected from the group consisting of real estate-related, medical-related, corporate-related, and financial-related.

6. The method as recited in claim 1, and further comprising collecting the data from the decision logic for generating visual displays of a decision hierarchy and an influence diagram.

7. The method as recited in claim 6, wherein the user is prompted to approve the visual displays of the decision hierarchy and the influence diagram.

8. The method as recited in claim 1, wherein a database interface provides an interlace between the database and the collaborative decision platform.

9. The method as recited in claim 1, wherein each column heading in the strategy table includes a strategic decision from a decision hierarchy with alternatives for a decision arranged therebeneath.

10. The method as recited in claim 1, wherein the tornado diagram identifies sources of significant risk in each of a plurality of alternative strategies and the decision sensitivity output displays identify sources of significant value in each of the alternative strategies.

11. The method as recited in claim 1, and further comprising: defining a minimum set of attributes; receiving first information regarding each of the minimum set of attributes from a receiving business; receiving second information regarding proposed products or services in terms of the minimum set of attributes, wherein the second information is received from a supplying business; executing a decision process based on the first information and the second information as to which products or services is suitable for the receiving business.

12. A computer program product for providing a collaborative decision platform adapted to run on a computer, comprising:
(a) computer code for executing an application capable of performing decision logic;
(b) computer code for retrieving information from a database in accordance with the decision logic;
(c) computer code for receiving information from a user in accordance with the decision logic utilizing a user interface;
(d) computer code for processing the information utilizing the decision logic;
(e) computer code for collecting data, wherein the data includes (i) policies that form boundary conditions associated with the decision logic, (ii) strategic decisions to be made, (iii) values that are important to the user, (iv) uncertainties that impact the values, and a relationship between (i)(iv);
(f) computer code for creating a strategy table using the data;
(g) computer code for assessing the uncertainties for analysis purposes; and
(h) computer code for generating a tornado diagram and decision sensitivity output displays;
(i) wherein computer code segments (a)–(d) are carried out by a collaborative decision platform capable of executing computer code segments (b)–(d) for different purposes by executing different applications each capable of performing different decision logic;
(j) wherein the decision logic provides a hybrid strategy;
(k) wherein an application interface provides an interface between the application and the collaborative decision platform, where computer code segments (b)–(d) are carried out using universal modules capable of interfacing with different applications adapted for applying the universal modules to different business sectors;
(l) wherein the collaborative decision platform communicates with the application through a standard interface protocol.

13. The computer program product as recited in claim 12, wherein the information is retrieved and received via a network.

14. The computer program product as recited in claim 13, wherein the network is the Internet.

15. The computer program product as recited in claim 12, wherein the purpose is selected from the group consisting of real estate-related, medical-related, corporate-related, and financial-related.

16. The computer program product as recited in claim 12, and further comprising computer code for collecting data from the decision logic for generating visual displays of a decision hierarchy and an influence diagram.

17. The computer program product as recited in claim 16, wherein the user is prompted to approve the visual displays of the decision hierarchy and the influence diagram.

18. The computer program product as recited in claim 13, wherein a database interface provides an interface between the database and the collaborative decision platform.

19. The computer program product as recited in claim 12, wherein each column heading in the strategy table includes a strategic decision from a decision hierarchy with alternatives for a decision arranged there beneath.

20. The computer program product as recited in claim 12, wherein the tornado diagram identifies sources of significant risk in each of a plurality of alternative strategies and the decision sensitivity output displays identify sources of significant value in each of the alternative strategies.

21. The computer program product as recited in claim 12, and further comprising at least one code segment for: defining a minimum set of attributes; receiving first information regarding each of the minimum set of attributes from a receiving business; receiving second information regarding proposed products or services in terms of the minimum set of attributes, wherein the second information is received from a supplying business; executing a decision process based on the first information and the second information as to which products or services is suitable for the receiving business.

22. A system for providing a collaborative decision platform adapted to run on a computer, comprising:
(a) logic for executing an application capable of performing decision logic;
(b) logic for retrieving information from a database in accordance with the decision logic;
(c) logic for receiving information from a user in accordance with the decision logic utilizing a user interface;
(d) logic for processing the information utilizing the decision logic;
(e) logic for collecting data, wherein the data includes (i) policies that form boundary conditions associated with the decision logic, (ii) strategic decisions to be made, (iii) values that are important to the user, (iv) uncertainties that impact the values, and a relationship between (i)(iv);

(f) logic for creating a strategy table using the data;

(g) logic for assessing the uncertainties for analysis purposes; and (h) logic for generating a tornado diagram and decision sensitivity output displays;

(i) wherein logic elements (a)–(d) are carried out by a collaborative decision platform capable of performing logic elements (b)–(d) for different purposes by executing different applications each capable of performing different decision logic;

(j) wherein the decision logic provides a hybrid strategy;

(k) wherein an application interface provides an interface between the application and the collaborative decision platform, where logic elements (b)–(d) are carried out using, universal modules capable of interfacing with different applications adapted for applying the universal modules to different business sectors;

(l) wherein the collaborative decision platform communicates with the application through a standard interface protocol.

* * * * *